United States Patent
Smith et al.

(10) Patent No.: US 9,424,281 B2
(45) Date of Patent: Aug. 23, 2016

(54) SYSTEMS AND METHODS FOR DOCUMENT AND MATERIAL MANAGEMENT

(71) Applicant: Magnum Software Development Limited, Esher (GB)

(72) Inventors: Graham Smith, Esher (GB); Steve Fleming, London (GB)

(73) Assignee: Magnum Software Development Limited, Esher (GB)

( * ) Notice: Subject to any disclaimer, the term of this patent is extended or adjusted under 35 U.S.C. 154(b) by 226 days.

(21) Appl. No.: 13/783,078

(22) Filed: Mar. 1, 2013

(65) Prior Publication Data

US 2013/0232149 A1    Sep. 5, 2013

Related U.S. Application Data

(60) Provisional application No. 61/605,719, filed on Mar. 1, 2012.

(51) Int. Cl.
*G06F 7/00* (2006.01)
*G06F 17/00* (2006.01)
*G06F 17/30* (2006.01)

(52) U.S. Cl.
CPC .... *G06F 17/30283* (2013.01); *G06F 17/30893* (2013.01)

(58) Field of Classification Search
CPC .............. G06F 17/30056; G06F 17/30283; G06F 17/30873; G06F 17/30893; G06F 17/30905
See application file for complete search history.

(56) References Cited

U.S. PATENT DOCUMENTS

| | | | |
|---|---|---|---|
| 7,013,289 B2* | 3/2006 | Horn et al. | 705/14.51 |
| 2002/0052954 A1 | 5/2002 | Polizzi et al. | |
| 2004/0088332 A1* | 5/2004 | Lee et al. | 707/200 |
| 2007/0288247 A1* | 12/2007 | Mackay | G06Q 10/00 705/1.1 |
| 2012/0265744 A1* | 10/2012 | Berkowitz | G06F 17/30873 707/705 |
| 2013/0018904 A1 | 1/2013 | Mankala et al. | |

OTHER PUBLICATIONS

International Application No. PCT/2014/019673, International Search Report and Written Opinion mailed Jul. 28, 2014.

* cited by examiner

*Primary Examiner* — Susan Chen
(74) *Attorney, Agent, or Firm* — Sheppard, Mullin, Richter & Hampton LLP

(57) ABSTRACT

In various embodiments, an exemplary system for viewing a content object through a web-based interface comprises a content object management module, an import/export module, a conversion module, and a GUI module. The content object management module may be configured to manage storage of the content object in the system. The import/export module may be configured to receive the content object from a database or an application external to the system, index the content object for viewing access by a user, and provide the computer readable material to the content object management module for management. The conversion module may be configured to convert the content object, received through the importation module, from a native format to a format viewable by the user through the system. The GUI module may be configured to present the content object to the user, through the web-based interface, in the viewable format.

18 Claims, 18 Drawing Sheets

FIG. 9

RE-RE-RE-AMENDED PARTICULARS OF CLAIM

Parties

*The Claimant*

C1. The Claimant ("Mr Berezovsky") is a refugee from Russia. He left Russia for France on 30 October 2000 and has not been able to return. He applied for asylum in the United Kingdom on 27 October 2001. His application was accepted on 10 September 2003. He is now resident in England.

C2. At the time Mr Berezovsky fled Russia, he was a businessman with substantial commercial interests in the Russian Federation, including the following:

(1) A shareholding in ZAO Logovaz ("Logovaz"), a Russian closed joint stock company carrying on the business of servicing and selling cars.

FIG. 10

RE-RE-RE-AMENDED PARTICULARS OF CLAIM

Parties

*The Claimant*

C1. The Claimant ("Mr Berez 1108 is a refugee from Russia. He left Russia for France on 30 October 2000 and has not been able to return. He applied for asylum in the United Kingdom. His application was accepted on 10 September 2003. He is now resident in England.

C2. At the time Mr Berezovsky fled Russia, he was a businessman with substantial commercial interests in the Russian Federation, including the following:

(1) A shareholding in ZAO Logovaz ("*Logovaz*"), a Russian closed joint stock company carrying on the business of servicing and selling cars.

R1-RF AMENDED PARTICULARS OF CLAIM

Parties

*The Claimant*

C1. The Claimant ("Mr B...om Russia. He left Russia for France on 30 October 2000 ... return. He applied for asylum in the United Kingdom on 2... ation was accepted on 10 September 2003. He is now resid...

C2. At the time Mr Berezovsky fled Russia, he was a businessman with substantial commercial interests in the Russian Federation, including the following:

(1) A shareholding in ZAO Logovaz ("Logovaz"), a Russian closed joint stock company carrying on the business of servicing and selling cars.

← 1400

ROMAN ARKADIEVICH ABRAMOVICH

Defendant

RE-RE-RE-AMENDED PARTICULARS OF CLAIM

1402

1406

1408

1412

Parties

*The Claimant*

C1. The Claim
1410 → United K... ... ... ... ... ... ... ... ... ... ... ... ... refugee from R... ... ... ... ... ... ... ... ... ... ... able to return ... in the
2003. He is now resident in England. His application was accepted ... to September
1414 1416

C2. At the time Mr Berezovsky fled Russia, he was a businessman with substantial commercial interests in the Russian Federation, including the following:

SYSTEMS AND METHODS FOR DOCUMENT AND MATERIAL MANAGEMENT

CROSS-REFERENCE TO RELATED APPLICATIONS

The present application claims benefit of U.S. Provisional Patent Application No. 61/605,719 filed Mar. 1, 2012, and entitled "Systems and Methods for Single-Interface Cloud-Based Access to Electronic Materials from Disparate Databases and Applications," which is incorporated by reference herein.

BACKGROUND

1. Technical Field

Embodiments described herein generally relate to management of electronic materials and, more particularly, relate to systems and methods for accessing, linking, annotating, and/or tagging electronic materials.

2. Description of Related Art

Growth of business, science, and legal opportunities and complexities has led to an increased need to share, modify, and organize voluminous documents and other materials. Although the concomitant growth of technology has allowed for increased ability to store voluminous documents and materials, meaningful management of access, modification, and organization of materials for numerous, remote individuals over different platforms remain a formidable challenge. Further, meaningful management of documents and materials from multiple sources that use different standards increases significant difficulties.

SUMMARY

In various embodiments, an exemplary system for viewing a content object through a web-based interface comprises a content object management module, an import/export module, a conversion module, and a GUI module. The content object management module may be configured to manage storage of the content object in the system. The import/export module may be configured to receive the content object from a database or an application external to the system, index the content object for viewing access by a user, and provide the computer readable material to the content object management module for management. The conversion module may be configured to convert the content object, received through the importation module, from a native format to a format viewable by the user through the system. The GUI module may be configured to present the content object to the user, through the web-based interface, in the viewable format.

In various embodiments, the system further comprises a connector module configured to access the database or the application and retrieve the content object from the database or the application. The connector module may be further configured to access the database or the application for the content object when the user requests to view the content object. The system may further comprise an access management module configured to control access to the database or the application external to the system.

In some embodiments, the database or the application external to the system is a cloud-based service. The content object may be a web page from a web site, and the import/export module may be further configured to retrieve the web page from the web site, index the web page for viewing access by a user, and provide the web page to the content object management module for management.

The system may further comprise a workspace management module configured to create a virtual workspace and associate the virtual workspace with the content object. In some embodiments, the virtual workspace is associated with the user or a group of users that includes the user, and the virtual workspace determines viewing access to the content object by the user or the group of users.

The system may further comprise a link module configured to create a link between the content object and another content object. In some embodiments, the system further comprises an annotation module configured to create an annotation and associate the annotation with the content object.

In various embodiments, the import/export module may be further configured to index content of the content object. In some embodiments, the system may further comprise a search module configured to search the content object based on content, a link associated with the content object, a user or group of users associated with the content object, a virtual workspace associated with the content object, an annotation associated with the content object, or a category tag associated with the content object.

The system may further comprise an access management module configured to manage viewing access to the content object by the user or a group of users that includes the user. The import/export module may be further configured to import the content object from the database or the application external to the system on a schedule or upon a request by the user to view the content object. A tagging module may be configured to create a category tag and associate the category tag with the content object.

An exemplary method may comprise viewing a content object through a web-based interface, the method comprising receiving the content object into a computer system from a database or an application external to the computer system, indexing the content object for viewing access by a user, converting the content object from a native format to a format viewable through the system, and presenting the content object to the user, through the web-based interface, in the viewable format.

A system for viewing a content object through a web-based interface comprises a means for receiving the content object, means for indexing the content object, the means for converting, and an a means for presenting. The means for receiving the content object into a computer system from a database or an application external to the computer system, the means for indexing the content object for viewing by a user, the means for converting the content object from a native format to a format viewable through the system. The means for presenting the content object in the viewable format through the web-based interface.

An exemplary system for linking content objects comprises an export/import module, a conversion module, and a link module. The export/import module may be configured to receive the first content object from a database or an application external to the system. The conversion module may be configured to convert the first content object, received through the importation module, from a native format to a format that permits a link to be created between the first content object and a second content object. The link module may be configured to create the link between the first content object and the second content object. In various embodiments, the first content object contains media content, a first endpoint of the link terminates at a position in the first content object, and a second endpoint of the link originates in the second content object. The position in the first content object may be a time position. Further, the second endpoint of the link in the second content object may relate to the position in the first content object.

In some embodiments, the first content object contains media content. Converting the first content object to the format that permits the link to be created between the first content object and the second content object may comprise dividing the media content in the first content object into a set of media content slices according to a predetermined time interval and saving the set of media content slices as a set of separate media files, wherein each media content slice in the set of media content slices corresponds to a separate media file in the set of separate media files, and each separate media file in the set of separate media files corresponds to a time span of the media content in the first content object. Creating the link between the first content object and the second content object may comprise creating the link such that a first endpoint of the link terminates at a time position in the first content object, a second endpoint of the link originates in the second content object, and the first endpoint of the link is associated with a separate media file in the set of separate media files that corresponds to the time position in the first content object.

In various embodiments, the second content object is a transcript file, and the second endpoint of the link in the second content object is associated with a timestamp of the transcript file that corresponds to the time position in the first content object. The link may originate from the area, and the position at which the link terminates is associated with the timestamp.

In some embodiments, creating the link between the first content object and the second content object comprises associating a first endpoint of the link in the first content object with a first content area in the first content object or associating the second endpoint of the link in the second content object with a second content area in the second content object.

The system may further comprise a link presentation module configured to present the link for use, in association with the first content object or the second content object, by overlaying a first endpoint of the link over the first content object or overlaying a second endpoint of the link over the second content object. The link may be a one-way link, a two-way link, a one endpoint-to-many endpoints link, or a many endpoints-to-one endpoint link.

The link module may be further configured to generate a notification when an action is performed in association with the link. The link module may also be further configured to generate a summary of links associated with the first content object. The system may further comprise an annotation module configured to create an annotation and associate the annotation with the link.

In some embodiments, the system further comprises a tagging module configured to create a category tag and associate the category tag with the link. The system may further comprise a workspace management module configured to create a virtual workspace and associate the virtual workspace with the link. In various embodiments, the system may further comprise an access management module configured to manage access to the link by the user or a group of users that includes the user.

They system may also comprise a search module configured to search for the link based on an endpoint of the link, an origin or a destination of the link, a type of link associated with the link, a user or group of users associated with the link, a virtual workspace associated with the link, an annotation associated with the link, or a category tag associated with the link.

An exemplary method for linking content objects may comprise receiving a first content object into a computer system from a database or an application external to the computer system, converting the first content object from a native format to a format that permits a link to be created between the first content object and a second content object, and creating the link between the link between the first content object and the second content object.

An exemplary system for viewing a computer readable artifact through a web-based interface may comprise a means for receiving a first content object into a computer system from a database or an application external to the computer system, a means for converting the first content object from a native format to a format that permits a link to be created between the first content object and a second content object, and a means for creating the link between the link between the first content object and the second content object.

An exemplary system for annotating content objects comprises an export/import module, a conversion module, and an annotation module. The export/import module may be configured to receive the content object from a database or an application external to the system. The conversion module may be configured to convert the content object, received through the importation module, from a native format to a format that permits an annotation to be created in association with the content object. The annotation module may be configured to create the annotation in association with the content object and to create a reply annotation in response to the annotation and associated with the annotation.

The annotation module may be further configured to add the reply annotation to a thread of reply annotations associated with the annotation. The annotation may be created at a first request by a first user and the reply annotation is created at a second request by a second user.

The annotation may be associated with a position in the content object. The position may relate to a content area in the content object. The content object may be a media file, and the position relates to a time position in the content object. The content object may be a transcript file, and the position relates to a timestamp in the content object.

The system may further comprise an annotation presentation module configured to present the annotation by overlaying the annotation over a position in the content object, wherein the position is associated with the annotation. In some embodiments, the annotation module is further configured to generate a notification when an action is performed in association with the annotation. The annotation module may be further configured to generate a summary of annotations associated with the content object.

In various embodiments, the system further comprises a link module configured to create a link and associate the link with the annotation. The system may further comprise a tagging module configured to create a category tag and associate the category tag with the annotation.

The system may further comprise a workspace management module configured to create a virtual workspace and associate the virtual workspace with the annotation. Further, the system may comprise an access management module configured to manage access to the annotation by the user or a group of users that includes the user. In some embodiments, the system may comprise a search module configured to search for the annotation based on content of the annotation, a link associated with the annotation, a type of annotation associated with the annotation, a user or group of users associated with the annotation, a virtual workspace associated with the annotation, or a category tag associated with the annotation.

An exemplary method for linking content objects may comprise receiving a content object into a computer system from a database or an application external to the computer system, converting the content object from a native format to a format that permits an annotation to be created in association with the content object, creating the annotation in association with the content object, and creating a reply annotation in response to the annotation and associated with the annotation. The method may further comprise adding the reply annotation to a thread of reply annotations associated with the annotation.

The annotation may be created at a first request by a first user and the reply annotation is created at a second request by a second user. The annotation may be associated with a position in the content object. The position may relate to a content area in the content object. The content object may be a media file, and the position relates to a time position in the content object. The content object may be a transcript file, and the position relates to a timestamp in the content object.

In various embodiments, the method may further comprise overlaying the annotation over a position in the content object, wherein the position is associated with the annotation. The method may further comprise generating a notification when an action is performed in association with the annotation.

The method may further comprise generating a summary of annotations associated with the content object. In some embodiments, the method may further comprise creating a link and associating the link with the annotation. In various embodiments, the method may further comprise creating a category tag and associating the category tag with the annotation. The method may further comprise creating a virtual workspace and associating the virtual workspace with the annotation.

The method may further comprise managing access to the annotation by the user or a group of users that includes the user. In some embodiments, the method may further comprise searching for the annotation based on content of the annotation, a link associated with the annotation, a type of annotation associated with the annotation, a user or group of users associated with the annotation, a virtual workspace associated with the annotation, or a category tag associated with the annotation.

An exemplary system for annotating content objects comprises a means for receiving a content object into a computer system from a database or an application external to the computer system, a means for converting the content object from a native format to a format that permits an annotation to be created in association with the content object, a means for creating the annotation in association with the content object, and a means for creating a reply annotation in response to the annotation and associated with the annotation.

BRIEF DESCRIPTION OF THE DRAWINGS

FIG. 9 depicts a screenshot of an exemplary web-interface for accessing a transcript having links and annotations associated with the transcript in accordance with some embodiments.

FIG. 10 depicts a screenshot of an exemplary web-interface for accessing a content object having a link, an annotation, or a category tag in accordance with some embodiments.

FIG. 11 depicts a screenshot of an exemplary web-interface for accessing a content object having annotations showing in accordance with some embodiments.

FIG. 13 depicts a screenshot of an exemplary web-interface for accessing a content object and creating links, annotations, and category tags in association with content areas in accordance with some embodiments.

FIG. 14 depicts a screenshot of an exemplary web-interface for accessing a content object and creating links in accordance with some embodiments.

FIG. 15 depicts a screenshot of an exemplary web-interface for accessing a content object, and creating or modifying links, annotations and/or category tags in accordance with some embodiments.

DETAILED DESCRIPTION

Systems and methods discussed herein describe sharing and accessing electronic documents and other materials among multiple digital devices. In some embodiments, such systems and methods may be used to manage and control complex ongoing operations involving sharing, modifying, adding, and deleting content of electronic materials from many sources for any number of individuals. The sources of electronic materials may be remotely located; similarly, the individuals may be remote to each other.

In one example, remote users access electronic material from many different sources through a unified interface. They may leverage the experience and electronic material to create, modify, link, or annotate the content to advance complex procedures. Specific materials and/or sets of materials may be shared with a subset of users. Further, changes to content of the materials (e.g., modifications, links, or annotations) may be shared with a subset of users thereby allowing the subset to view and/or make further changes.

In one example, some systems and methods may be used in complex litigation cases which depend on tens of thousands of documents (or more) including deposition transcripts, expert reports, notes, pleadings, motions, and declarations. Systems and methods may allow judges, court personnel, experts, and attorneys to access various subsets of electronic material including documents, video, slides, audio, photographs, and the like. Changes to the materials may also be selectively shared with specific users or a subset of chosen users.

Figure 1:
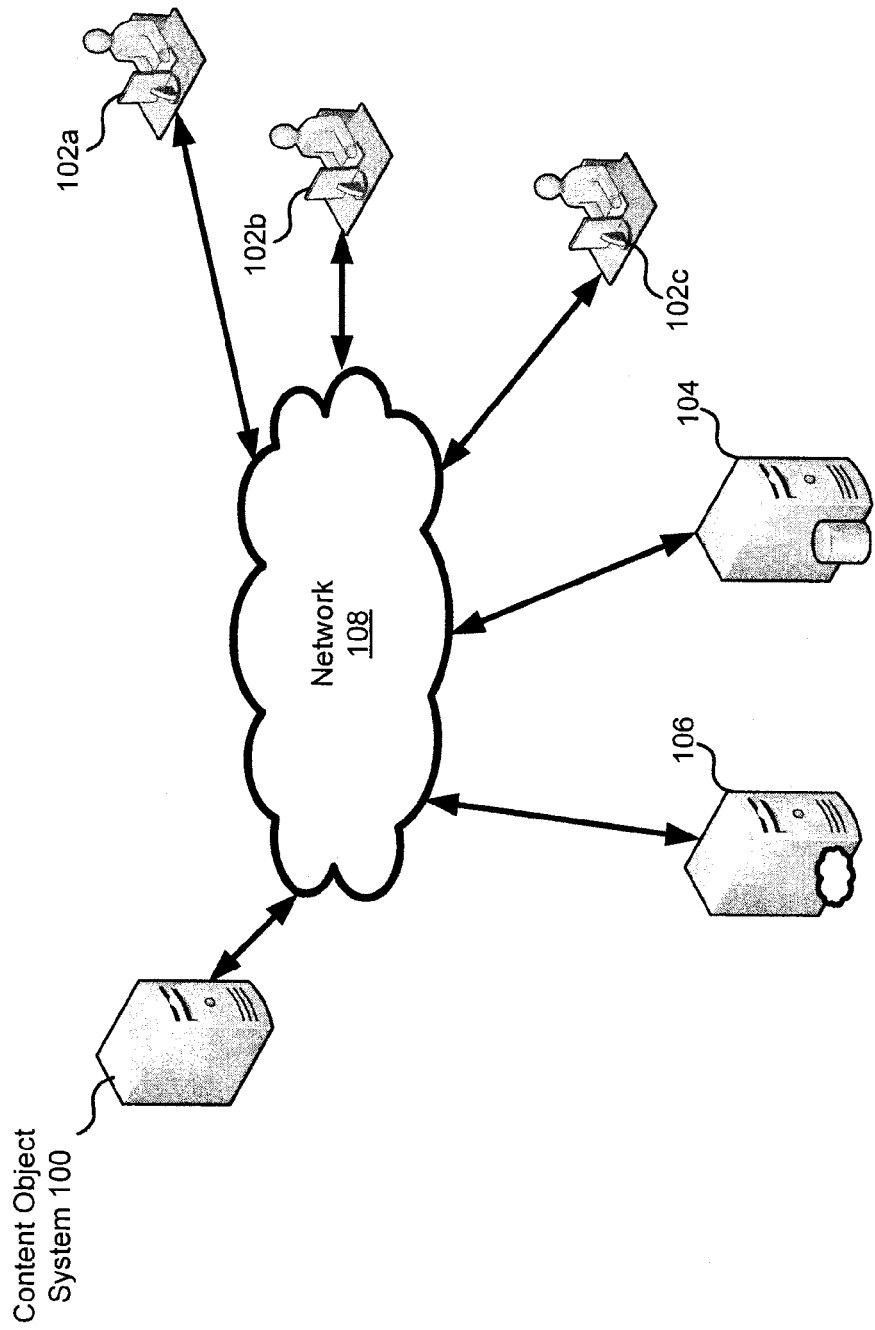
FIG. 1 depicts the exemplary system for accessing shared content from multiple different sources with some embodiments.

FIG. 1 depicts the exemplary system for accessing shared content from multiple different sources with some embodiments. In FIG. 1, the content object system 100 shares content (in the form of content objects) with computing devices 102a-c over a network 108. The content object system 100, computing devices 102ac, and servers 104 and 106 may be digital devices. A digital device is any device with a processor and memory. Digital devices are further discussed herein. One or more users may interact with the content object system 100 using computing devices 102a-c which communicates with the content object system 100 through network 108.

In some embodiments, the content object system 100 provides for single-interface access (e.g., web-based access) to electronic materials from a set of disparate databases or applications. The databases or applications may be located on a user's computer or located remotely (e.g., via the Internet). Content accessible via the content object system 100 may be provided from the servers 104 and 106.

In some embodiments, a network-based interface provided by the content object system 100 allows users across different digital devices to access and/or modify electronic materials from a set of disparate databases or applications (e.g., located at servers 104 and/or 106). The network-based interface may be provided through a web-based interface (e.g., the network-based interface may be cloud based), and, in some embodiments, may be configured to access electronic materials as a cloud-based service (e.g., System-as-a-Service (SaaS)).

Various systems and methods described herein may manage, provide access, and link a large number of electronic materials as content objects. Some embodiments may: 1) provide for linking within and between electronic materials from the set of disparate databases or applications; 2) provide for annotating electronic materials accessed from the set of disparate databases or applications; and/or 3) provide for category tagging (e.g., tagging content by category or other identifier) of content, content objects, links, and/or annotations (e.g., notes, comments, or markups).

A secure web-based service may be provided to a group of users (such as litigation team), through which users can collaboratively access, annotate, link and/or tag content of content objects (e.g., word processing documents, spreadsheets, post-script documents, transcripts, media files, or extendable markup-language documents such as HTML). An object is a discrete computer readable entity. In some embodiments, a content object is an object that includes content from any kind of electronic media, including documents, spreadsheets, photographs, video, audio, presentations, and/or the like. In one example, a content object is a discrete file.

Collaboration by the group of users may be performed in the context of, and organized according to, a virtual workspace. A virtual workspace is a workspace that may provide content and/or access to different electronic materials depending on user's rights and permissions. Further the virtual workspace may provide different tools and functionality. In some embodiments, a unified interface may provide different virtual workspaces to different users to a large amount of content based on numerous content objects.

Embodiments may provide a group of users the ability to collaboratively access, link, annotate and/or categorically tag important electronic materials (e.g., transcripts, video files, audio files, word processing documents, spreadsheets, or extendable markup-language documents such as HTML) associated with a project (e.g., a litigation). In one example, a web-interface may provide access from many locations simultaneously or near simultaneously, using any device. The web-interface may allow for secure sharing of links annotations (e.g., commentary), and/or category tags with a team of users. The links may comprise hyperlinks that allow for easy creation and usage by team members. In certain embodiments, web pages may be captured directly from web resources (e.g., via a universal resource locator [URL]) and preserved into the system, allowing for quick and easy capture of Internet research results (e.g., case law research, witness research, and press article research) and allowing for linking, annotation, and/or tagging of such web pages using the embodiments. Various embodiments may permit easy sharing of annotations amongst a team of users, and may allow associated annotations to be built into or presented as a thread of commentary that may be viewed by the team of users.

Alert notifications (e.g., e-mails or SMS) may be generated and sent to teams of users when actions are performed in relation to an annotation, a link, a category tag, or some combination thereof. Annotations, links, category tags, and/or electronic materials may be sought out and filtered through associations between the various elements (e.g., annotations, links, category tags, or electronic materials). Some embodiments may include a web-interface through which content objects may be accessed from, or presented at, one of a variety of locations (e.g., securely accessed from an office or securely presented in a court room over the Internet for evidence purposes). Some embodiments may provide role-driven access, where certain stake holders or interested parties in a given project (e.g., judge, or client) can be granted permission to review designated electronic materials accessible through the embodiments, while being denied access to review, use, or modify links, annotations, and/or category tags associated with such electronic materials using the embodiments.

Electronic materials, such as content objects, may include text files (e.g., source code), word processing documents, spreadsheets, slide-show presentations, images, animation, video, or audio. The disparate databases and applications accessible by various embodiments may include software configuration management systems (e.g., CVS, Microsoft® Visual SourceSafe®, IBM® Rational® ClearCase®), research databases (e.g., Westlaw® or LexisNexis®), electronic discovery and document review systems (e.g., Concordance® by LexisNexis®, Acuity® and Ringtale™ by FTI Technology, Summation by AccessData®, or Relativity® by kCura®), court documentation systems (e.g., PACER by the U.S. Federal Court system, CM/ECF used by U.S. Federal Courts), cloud-based applications (e.g., Google® Docs, Microsoft® Office Live®, Box.net), or cloud-based storage (e.g., Dropbox or Box.net).

The web-interface may provide uniform access to electronic materials that vary in original format and/or type, allow creation of links between such electronic materials regardless of their original format and/or type, and permit uniform usage of link through the web-interface. For example, the web-interface may permit a user to access a word processing document and a video file through the web-interface, create a link from a portion of the word processing document to the video file (e.g., at a specific time position in the video file), and then use/traverse the link from the word processing document to the video file (e.g., at the specific time position) through the web-interface (e.g., open the video file in the web-interface, at the specific time position, and either in a separate window, overlaid over of the word processing document, or adjacent to the word processing document). The web-interface may allow creation of annotations in association with electronic materials, regardless of their original format, and permit uniform reviewing and modification of such annotations. The web-interface may further permit creation and association of tags to electronic materials and any links or annotations contained therein.

In a litigation context, key documents and deposition materials (transcripts, exhibits, audio, and video synchronize with the transcript) can be securely hosted on the web, with a single web interface that enables users to easily annotate, link, tag and easily share those annotations, links, and tags with all or some team members (e.g., a set or subset of counsel, associates, and/or experts). Accordingly, various embodiments may be utilized in case preparation, may provide significant cost benefits through the case deposition process, and may also provide an team of users with controlled and secure access over the Internet to one or more virtual workspaces, each relating to a different litigation case and each allowing access to content of a set of content objects (e.g., word processing document, spreadsheets, media recordings, or transcripts) and associated links, annotations, and/or category tags. Generally, each virtual workspace may organize content objects for a project, and store annotations, links, and/or category tags associated with content objects in the context of the project.

Figure 2:
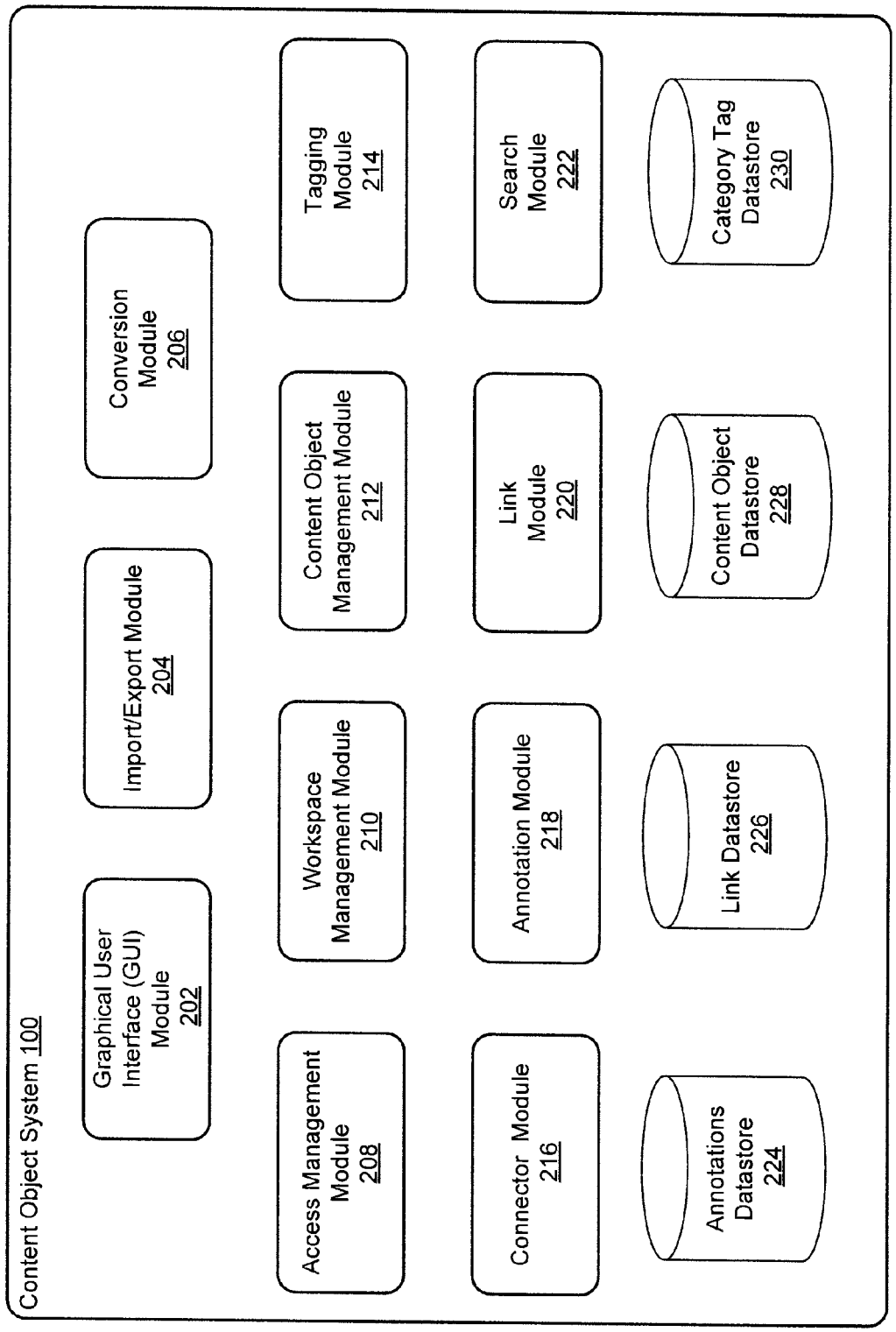
FIG. 2 depicts an exemplary content object system for accessing a content object in accordance with some embodiments.

FIG. 2 depicts an exemplary content object system 100 for accessing a content object in accordance with some embodiments. The content object system 100 comprises a graphical user interface (GUI) module 202, an import/export module 204, a conversion module 206, an access management module 208, a workspace management module 210, a content object management module 212, a tagging module 214, a connector module 216, an annotation module 218, a link module 220, a search module 222, an annotation datastore 224, a link datastore 226, a content object datastore 228, and a category tag datastore 230.

The graphical user interface (GUI) module 202 may be configured to provide an interface by which a user may interact with the content object system 100. Depending on the embodiment, the GUI module 202 may provide the interface as an application interface as a web-interface accessible by the user access through a web browser.

In some embodiments, the GUI module 202 may generate any number of virtual workspaces to deliver access to all or some tools as well as select content and/or content objects. For example, the interface provided by the GUI module 202 may permit the user to add, delete, view, or modify content of one or more content objects (e.g., add, delete, view, or modify electronic materials by modifying content objects).

The GUI module 202 may also provide the user with an interface to link, annotation, and/or tagging functionality with respect to content. For example, the GUI module 202 may be configured to facilitate presentation, creation, deletion, or modification of content and/or content objects. Further, the GUI module 202 may be configured to allow for the creation of a link between content and/or content objects. In various embodiments, content objects may be accessed, presented, and/or provided by different remote digital devices. In some embodiments, content objects from different digital devices may be copied and stored (e.g., by the import/export module 204) in one or more other digital devices (e.g., for presentation through a virtually centralized system).

In some embodiments, content and/or content objects may be added to or exported from the content object system 100 utilizing the import/export module 204 and/or conversion module 206. The import/export module 204 may be configured to import content and/or content objects into the content object system 100, or export content or content objects from the content object system 100. For example, the import/export module 204 may receive the content from a database or an application external to the content object system 100.

Through the import/export module 204, the content object system 100 may automatically import the content or content object, into the content object system 100, at or near a time a user requests access (e.g., via an interface) to the content and/or information from a content object (e.g., importation is performed just-in-time for access). For example, a user, through an interface provided by the GUI module 202, may view content that is available only on a remote digital device and/or seek to add content not previously available. The import/export module 204 may retrieve content from the remote digital device and/or receive new content not previously available (e.g., by adding a file not previously linked to the content object system 100).

The import/export module 204 may perform the importation process in advance of the user's request for access to the content and/or content object. For instance, at the request of a user or a system administrator, the content and/or content object(s) may be imported into the content object system 100 in advance of the user's access request. Furthermore, the content object system 100 may automatically import content and/or content object through the import/export module 204 based on a predetermined schedule (e.g., hourly, daily, monthly, or the like).

In some embodiments, the import/export module 204 may import and the content object management module 212 may persistently store content within one or more content objects to facilitate online and offline access of the content and/or content object by any number of users.

The content and/or content object received by the import/export module 204 may be in any format. For example, content and/or a content object imported from LexisNexis® may be in a PostScript Document Format (PDF). In another instance involving the context of electronic documents in a litigation, the import/export module 204 may import content and/or content object by way of a load file (e.g., that is compatible with Concordance® by LexisNexis®, Acuity® and Ringtale™ by FTI Technology, Summation by Access-Data®, or Relativity® by kCura®), which may contain information about the content and/or content object to be imported into the content object system 100 (e.g., location of data to be imported and association between data imported).

Upon receiving the content, the import/export module 204 may index the content for access by one or more users. For instance, the import/export module 204 may add content and/or a newly generated content object to an index that lists content and/or content objects available for access through the content object system 100. The import/export module 204 may be further configured to index content of the content object, thereby enabling the content object to be sought and located.

In various embodiments, the import/export module 204 may collect information relating to or associated with the content and/or content object as the content and/or content object is received by the content object system 100. Exemplary information that may be collected for (and from) the content and/or content object may include metadata of the content and/or content object, a link embedded in the content and/or content object (e.g., hyperlinks), an annotation embedded in the content and/or content object (e.g., embedded comments for a Microsoft® Word document), or tags embedded in the content and/or content object.

Once collected, the import/export module 204 may provide such information to the content object management module 212 for storage and/or association with the content and/or content object. For some embodiments, such information may be stored in a database and associated in the database with the content and/or content object. Additionally, for some embodiments, such information may be stored in a flat file (e.g., CSV file), which may be located in the same storage location (e.g., directory or storage device) as the content and/or content object and which may be associated with the content and/or content object by way of a file naming convention (e.g., name the flat file similarly to the content and/or content object). Furthermore, a flat file storing the collected information may be associated with the content and/or content object by way of a database or datastore configured to store such an association.

In various embodiments, when the content object is accessed by the user, information stored on the content object system 100 relating to or associated with the content object may be recalled and utilized as part of the access process. For instance, when the user accesses the content object for viewing, stored information relating to or associated with the content object may be recalled and presented to the user, with the content object, through the interface provided by the GUI module 202. In another example, the stored information may be used in allowing or denying a user access to certain content objects on the content object system 100. For example, where stored information indicates the content objects contain confidential sales information and the access management module 208 indicates that such sales information is only viewable by certain individuals.

The stored information relating to or associated with the content object may comprise embedded link information, from which the import/export module 204 may create one or more links for the content object that are accessible through the computer content object system 100 in association with the content object (e.g., the content object is presented with converted links accessible through the content object system 100). Various embodiments may employ the link module 220 when creating a link for the content object in accordance with the embedded link information.

Where the content object comprises embedded annotation or tag information, the import/export module 204 may create one or more annotations or tags and associated such annotations or tags with the content object. Various embodiments may employ the annotation module 218 when creating an annotation for the content object in accordance with the embedded annotation information, and may employ the tagging module 214 when creating a tag for the content object in accordance with the embedded tag information.

In certain embodiments, where a newer version of the content object is imported into the content object system 100, the import/export module 204 may carry over or remap links, category tags and/or annotations applied to or associated with the older version of the content object (e.g., by way of the content object system 100) to the newer version of the content object.

For example, consider where the content object is originally imported from a database source external to the content object system 100 and the content object on the database source is updated. In such a situation, the import/export module 204 may (automatically) import the updated content object into the content object system 100 from the database source, and carry over/remap the links, category tags and/or annotations applied to or associated with the older version of the content object to the updated version of the content object.

In another example, where the content object comprises a word processing document, the user may instruct the content object system 100 to import a newer version of the word processing document (e.g., from their laptop) into the content object system 100. As a result, the import/export 204 (of the content object system 100) may receive the newer version of the word processing document, optionally use the conversion module 206 to convert the newer version of the word processing document to a format accessible through the content object system 100, and replace the older version of the word processing document on the content object system 100 with the newer version of the word processing document (e.g., provide the newer version of the word processing document to the content object management module 212 for storage, and for replacement of the older version of the word processing document). During this importation process, the import/export module 204 may also carry over or remap any links, category tags, and/or annotations applied to or associated with the older version of the word processing document to the newer version of the word processing document.

As described herein, the links, category tags, and/or annotations carried over or remapped to the newer version of the content object (by the import/export module 204) may have been originally applied or associated with the older version of the content object using the link module 220, the tagging module 214, or the annotation module 218, respectively.

In some embodiments, the import/export module 204 may enable the user to export the content object from the content object system 100 to an external destination, such a computer system external to the content object system 100 (e.g., user's desktop computer).

In various embodiments, content and/or content objects that are imported into the content object system 100 are stored in the content and/or content objects' original format. For example, files in Microsoft Word may be imported into the content object system 100 as a Microsoft Word file. Similarly, image files, audio files, video files, spreadsheets, CAD designs, and the like may be imported into the content object system 100 in the same format.

In some embodiments, the conversion module 206 may be configured to convert some or all content and/or content objects from a native format (e.g., format of the object as it exists on the external database or application) to a format compatible for use (e.g., viewing, modifying, annotating, linking, tagging by a user) through the content object system 100.

In one example, the conversion module 206 may convert documents and/or other files to PDFs to provide a universal format. Other media may be stored as the original content and/or file (e.g., a JPG image may be imported by the import/export module 204 as a JPG image). By storing at least some content and/or content objects as PDFs, views of the content of the PDFs may be standardized across different platforms and different display sizes. Further, additional information such as annotations, links, and tags may be overlaid within the PDF. In some embodiments, different users may have different rights and/or permissions to view, modify, add, and/or delete all or some overlaid information. For example, a first user may not have access to view or change any overlaid information, while a second user may have access to view annotations and links but not tags. A third user may have access to specific annotations but not others. Those skilled in the art will appreciate that any amount of overlaid information may be shared and/or controlled in any number of ways.

In addition, in some embodiments, the conversion module 206 may convert the content object from a native format to a format that permits the content object to be viewed through the content object system 100, that permits the link module 220 to create a link between a first content object and a second content object, that permits the annotation module 218 to create an annotation in association with a content object, or that permits the tagging module 214 to create a category tag and/or associate a category tag with a content object. In some embodiments, the conversion module 206 may be configured to convert a content object (e.g., received from an external database or application through the import/export module 204) such that the link module 220 can create, delete, or modify a link between the computer readable object and another content object. Additionally, the content object may be converted to a format which enables the GUI module 202 to present the link, for user access, in conjunction with the content object to which it is associated.

In various embodiments, the conversion module 206 may convert the content object from a format accessible through the content object system 100 to another format as the content object is exported through the import/export module 204. Furthermore, during a conversion process, the conversion module 206 may preserve a copy of the content object in its native format for future purposes (e.g., client request a copy of the content object in the material's native form).

In some embodiments, the conversion module 206 may be automatically employed in converting the content object, as needed, when the content object is imported or exported through the import/export module 204. In one example, the conversion module 206 may automatically convert the content object at or near the time the user requests access to the content object (e.g., importation and conversion is performed just-in-time for access). Further, the conversion module 206 may perform the conversion processes in advance of the user requesting access to the content object (e.g., when the content object has been manually imported and converted into the content object system 100 in advance of the user's access request).

It will be appreciated by those skilled in the art that where the format of the content object is already compatible for access through the content object system 100, the conversion module 206 may not be utilized during importation of the content object into the content object system 100. In various embodiments, the accessible format utilized by the content object system 100 may differ based on the type of electronic material to be converted. For instance, content objects that are text-based (e.g., such as word processing documents and spreadsheets) and/or based on static images (e.g., slide shows) may be uniformly converted to the viewable format of PostScript Document Format (PDF). In another example, content objects that are a particular audio format, such as MPEG Layer-3 Audio (MP3), Waveform Audio Format (WAV), or Windows Media Audio (WMA), may be reformatted to Ogg Vorbis (OGG).

The access management module 208 may be configured to determine and/or control the user's accessibility to content and/or content objects available through the content object system 100, and accessibility to links, annotations, and category tags associated with content objects available through the content object system 100. For example, the access management module 208 may (e.g., by an administrator) set permissions and/or rights for users and/or groups of users (e.g., view-only access to the content object by one or more users or a user group).

In another example, the access management module 208 may set user rights and permissions as well as, based on the rights and permissions, determine whether a user can create, delete, and/or modify: 1) a link between content objects; 2) an annotation in association with a content object; and/or 3) a tag in association with a content object. Examples of modifying a link may include, without limitation, changing the endpoints of a link, associating or disassociating an annotation or category tag with respect to the link (e.g., where the annotation is created using the annotation module 218 and the category tag is created using the tagging module 214), or permitting a reply annotation to be associated to or disassociated from an annotation already associated with the link (e.g., an annotation that is posted in response to already existing annotation, thereby creating an annotation thread associated with the link). As noted herein, the GUI module 202 may be configured to provide an interface that permits a user, such as an administrator, to configure access control to content objects, links, annotations, and/or tags through access management module 208.

The workspace management module 210 may be configured to create a virtual workspace and associate the virtual workspace with the content object. Based on a user's rights to content and/or content objects, as well as the user's rights and permissions to access other information (e.g., view and/or modify annotations, links, tags), the workspace management module 210 may display a virtual workspace. In various embodiments, the workspace management module 210 may generate a virtual workspace based on the user's rights and permissions. In some embodiments, the workspace management module 210 may select a virtual workspace from a plurality of virtual workspaces. In one example, the workspace management module 210 may select the virtual workspace based on the user, the user's rights, and/or the user's permissions.

The workspace management module 210 may further facilitate the deletion, modification or disassociation of virtual workspaces. Various embodiments may utilize the virtual workspace to organize electronic material according to projects and/or matters being performed by the user and associated with the virtual workspace. A virtual workspace may provide a context within which a group of content objects may be organized (e.g., directory structure, and object listings), linked together (e.g., with one another or with objects external the embodiment using the link module 220), annotated (e.g., annotation applied to and associated with a content object using the annotation module 218), or tagged (e.g., category tag applied to and associated with a content object using the tagging module 214). Additionally, the annotations, tags, and links associated with a content object under one virtual workspace may distinct from those associated with the same content object under another virtual workspace.

In certain embodiments, when a content object is associated with a particular virtual workspace, any links, annotations, or tags associated with the content object may also be associated with the virtual workspace. In this way, links, annotations, or tags may be sought and located (e.g., using the search module 222) based on their respective association with a given virtual workspace. Additionally, for some embodiments, the virtual workspace may be associated with the user (or a group of users) that includes the user, such that the virtual workspace determines access by the user (or the group of users) to the content object links, annotations, and/or tags associated with the content object.

The content object management module 212 may be configured to manage storage of the content object on the content object system 100. In particular embodiments, the content object management module 212 may manage the directory structure and/or storage location of the content object on the content object system 100. For example, the content object management module 212 may store imported content objects in directories named according to the time and date of importation. The content object management module 212 may also track content objects that are stored persistently (e.g., for online and offline access) or temporarily (e.g., for online access). In connection with the content object, the content object management module 212 may manage the storage of links associated with the content objection (e.g., storing the link association in a flat file located in the same storage directory as the content object).

The tagging module 214 may be configured to create a category tag and associate the category tag with the content object, a link associated with the content object, or an annotation associated with the content object. A tag may be any information. A tag may be associated with any amount of content and/or any number of content objects. In various embodiments, a tag includes a category identifier thereby allowing users to tag information of importance that may be grouped or linked. For example, in a contracts matter, all content that is directed to financial loss may be tagged as damages and/or remedies.

The tagging module 214 may facilitate the deletion, modification or disassociation of tags (e.g., category tags). For some embodiments, the tag comprises a category name and enables a user (e.g., with the correct rights and/or permissions) to associate the content object or, alternatively, a link or annotation, with a given category (possibly for organization purposes). Using associations between the tag and a content object, a link, or an annotation, various embodiments may permit the user to search for, or obtain a listing of, content objects, annotations, links, or users based on a tag.

The connector module 216 may be configured to access a database or an application external to the content object system 100. Additionally, the connector module 216 may be further configured to retrieve content and/or content objects from the database or the application once access has been achieved. In some embodiments, the connector module 216 may comprise of Application Program Interfaces (APIs) and/or adapters required for the content object system 100 to gain access to the database or application. For example, the connector module 216 may be configured to establish a connection with the database or the application using APIs and/or adapters, where the connection may possibly be over a network. The connector module 216 may access the database or the application when the user requests to access the content object originating or residing on the database or the application, or a user uses/traverses a link to a content object residing or originating from the database or application.

The annotation module 218 may be configured to create an annotation and associate the annotation with the content object or a link associated with the content object. For instance, a user may create and associate a comment with a particular point on the timeline of a video file, or create and associate a comment with a section of text in a word processing document. Some exemplary annotations may include text-based comments associated with a content object, image-based comments with a content object, or markups overlaid over content area of a content object. Where the annotation is a text-based comment, the textual content of the annotation may include one or more embedded links associated with resources internal or external to the content object system 100. Annotations may include text, video, audio, and/or any kind of media.

The annotation module 218 may further facilitate the deletion of annotations, modification of annotations, or disassociation of annotations from content objects. The associations of an annotation with a content objects, links, and/or category tags may permit a user to search for, or obtain a listing of, content objects, links, category tag, or users based on the annotation.

The annotation module 218 may store and/or display threads of annotation. For example, the annotation module 218 be configured such that a first user can create an annotation in association with the content object and then, subsequently, a second user (or, alternatively, the first user) can create a reply annotation in response to the annotation, which is then associated with the annotation. When a reply annotation is created in response to and associated with a particular annotation, the annotation module 218 may add the reply annotation to a thread of reply annotations associated with the particular annotation. By maintaining a thread of reply annotations in association with a given annotation of a content object, the annotation module 218 may facilitate a dialog/discussion between two or more users (e.g., on a team) regarding the given annotation. The dialog/discussion may occur among any number of remote users in real time. Depending on the embodiment, the annotation module 218 may be configured to maintain two or more separate threads of reply annotations for a given annotation.

Additionally, for various embodiments, the annotation module 218 may be configured such that a reply annotation by a second user (or, alternatively, a first user) may be created in connection with a link originally created by a first user. The reply annotation may be associated with the entire link (i.e., all endpoints of the link) or a particular endpoint of the link. For some such embodiments, the annotation module 218 may maintain a thread of reply annotations for a given link of a content object. As noted before, by permitting creation of reply annotations in response to a given link associated with a content object, the annotation module 218 may facilitate a dialog/discussion between two or more users (e.g., on a team) regarding the given link. Depending on the embodiment, the annotation module 218 may be configured to maintain two or more separate threads of reply annotations for a given link.

For example, the annotation module 218 may create an annotation in association with a content object (e.g., first user creates an annotation in association with a content object already annotated by the system by a second user), remove an annotation from a content object, associate an annotation with a link in a content object (e.g., a first user's reply annotation to a link created in the content object by a second user), or associating the a category tag with an annotation. In addition, the annotation module 218 may be further configured to generate a summary of annotations associated with a particular content object (e.g., the first content object).

The annotation module 218 may be further configured to generate a notification when an action is performed in association with the annotation. A first user or administrator may have rights or permissions to identify one or more other users to receive notifications when an annotation, link, and/or tag are created. For example, an administrator may identify groups of individuals who will work collaboratively such that when any member of the group makes changes, adds or modifies annotations, or the like, the rest of the group is notified. In some embodiments, the notification includes a link to one or more different changes to content and/or content objects. The rights and/or permissions of specific users may also be controlled such that all or part of one or more threads may be viewed or changed by a limited number of users.

In some embodiments, through the interface provided by the GUI module 202, a user may also associate a link with or disassociate a link from an annotation (e.g., an annotation created using the annotation module 218), view or respond to an annotation already associated with the link (e.g., respond to an existing annotation with another annotation using the annotation module 218), associate a category link with or disassociate a category tag from the link (e.g., a category tag created using the tagging module 214), or view a category tag already associated with the link.

In another example, the GUI module 202 may be configured to facilitate the presentation, creation, deletion, or modification of an annotation associated with a content object, where the content object are under the management of the content object system 100 (e.g., imported into the content object system 100 via the import/export module 204. Through the GUI module 202, a user may also associate the annotation with or disassociate the annotation from a link (e.g., a link created using the link module 220), view or respond to the annotation (e.g., respond to an existing annotation with a reply annotation created through the annotation module 218), associate a category link with or disassociate a category tag from the annotation (e.g., a category tag created using the tagging module 214), or view a category tag already associated with the annotation.

When performing actions with respect to the link (e.g., presentation, creation, deletion or modification processes), the GUI module 202 may interact and/or utilize the link module 220. Additionally, when presenting the link (e.g., link overlaid over a word processing document being accessed through the content object system 100), the GUI module 202 may also present attributes (e.g., source and destination of the link), virtual workspaces, annotations, and category tags associated with the link, which may involve the GUI module 202 interacting with link module 220, the workspace management module 210, the annotation module 218, and the tagging module 214.

The link module 220 may be configured to create, delete, or modify a link between the content object and another content object. In one example, the link module 220 may enable a user to create a link from a section of text in a word processing document to a specific position in an audio file (i.e., a location in the timeline of the audio file). In this example, a text transcript may include links to a media file thereby allowing a user to select relevant portions of the text transcript and be linked to the relevant portion of a video deposition.

In another example, the link module 220 may enable a user to change an endpoint of a link, or modify the type of link created between the two content objects (e.g., one-way link, two-way link). Depending on the embodiment, the link created may be a one-way link, a two-way link, or a one-to-many link (e.g., traversing the link causes multiple content objects to accessed/presented). When a link is created, the link module 220 may also associate the link with the content object, an annotation, category tag, or the user creating the link. For some embodiments, such associations may permit the user to search for, or obtain a listing of, content objects, annotations, category tag, or users based on a link.

The search module 222 may be configured to search for content and/or content objects based on content, a link associated with the content object, a user or group of users associated with the content object, a virtual workspace associated with the content object, an annotation associated with the content object, and/or a category tag associated with the content object. The search module 222 may be further configured to search for a link, an annotation, a user, or a category tag based on their respective characteristics (e.g., destination and origin of link, content of the annotation, user name, or a category name).

Depending on the embodiment, the search module 222 may utilize various datastores of the computer readable object access system 100 (e.g., the annotation datastore 224, the link datastore 226, the content object datastore 228, the category tag datastore 230) in performing search processes. A datastore is any kind of data structure. Further, a datastore may include number of data structures of any kind(s).

The annotation datastore 224 may be configured to store contents of an annotation created by the annotation module 218, an association of the annotation to the content and/or content object, an association of the annotation to a link created by the link module 220, or an association of the annotation to a category tag created by the tagging module 214. The link datastore 226 may be configured to store a link created between different kinds of content, a link created between content objects, an association of the link to an annotation created by the annotation module 218, or an association of the link to a category tag created by the tagging module 214.

The content object datastore 228 may be configured to persistently or temporarily store content objects (e.g., store a content object that is imported into the content object system 100 through the import/export module 204). In some embodiments, the content object datastore 228 may comprise a file server, which may have a directory structure for storing and organizing content objects, and which may use a directory and/or file naming convention used in identifying the content object, associating the computer readable content with another the content object, or with information conveying information relating to the content object (e.g., the date of importation, the import source, or the file type for the content object). Additionally, in some embodiments, the content object datastore 228 may store an association of a content object stored on the content object datastore 228 with a link created by the link module 220, a category tag created by the tagging module 214, or an annotation created by the annotation module 218.

The category tag datastore 230 may be configured to store a name/label for a category tag created by the tagging module 214, properties of the category tag (e.g., color, or organization), an association of the category tag to the content object, or an association of the category tag to a link created by the link module 220.

Depending on the embodiment, some or all of the datastores 124, 126, 128, and 130 may be implemented using a flat file (e.g., CSV file) or a database system, and may use a common flat file or database system. In some embodiments, where a flat file is utilized to implement some or all of the datastores 124, 126, 128, and 130, such a flat file may be stored in the same storage location as the content object, and may have a file name that relates to the content object. For instance, for a content object comprising an Excel spreadsheet named "2010 Sales Figures.xls," links associated with the content object may be stored in a flat file named "2010 Sale Figures.lks," annotations associated with the content object may be stored in a flat file named "2010 Sale Figures.ant," and category tags associated with the content object may be stored in a flat file named "2010 Sale Figures.tgs." Alternatively, links, annotations, and category tags associated with the content object comprising "2010 Sales Figures.xls" may be stored in a single flat file named "2010 Sale Figures.lac," or a single database system.

The operations described herein may be implemented as a method or implemented using a computer system. An exemplary method for linking content objects, may comprise receiving a first content object into a computer system from a database or an application external to the computer system, and converting the first content object from a native format (e.g., format of the object as it exists on the external database or application) to a link format that permits a link to be created between the first content object and a second content object. The exemplary linking method may further comprise creating the link between the link between the first content object and the second content object. An exemplary method for annotating content objects, may comprise receiving a content object into a computer system from a database or an application external to the computer system, and converting the content object from a native format to a format that permits an annotation to be created in association with the content object. The exemplary annotation method may further comprise creating the annotation in association with the content object (e.g., at the request of first user) and, possibly creating a reply annotation in response to the annotation and associated with the annotation (e.g., at the request of a second user).

Figure 3:
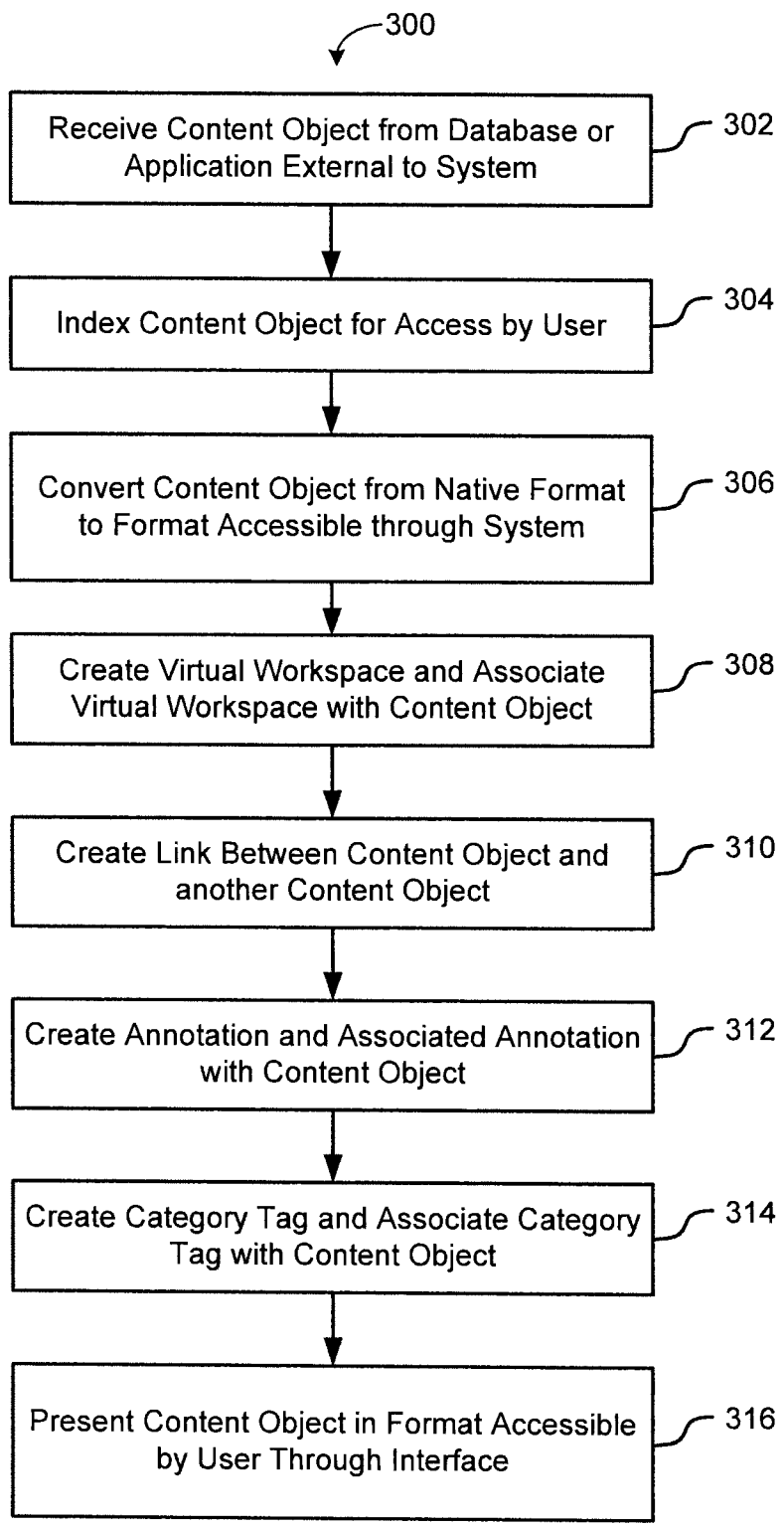
FIG. 3 depicts a flowchart illustrating an exemplary method for accessing content and/or a content object in accordance with some embodiments.

It will be appreciated that a "module" may comprise software, hardware, firmware, and/or circuitry. In one example one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, as previously discussed, the functions of the various modules may be combined or divided differently FIG. 3 depicts a flowchart illustrating an exemplary method 300 for accessing content and/or a content object in accordance with some embodiments. At step 302, the content object system 100 may receive content and/or a content object from a database or an application external to the content object system 100. In one example, a content object may be one that a user requests to access (e.g., request to view or modify the content object). In some embodiments, the content object system 100 receives the content object using the connector module 216, which may establish a connection with the external database or application, and the import/export module 204, which may retrieve the content object for the content object system 100. As noted herein, the retrieval of the content object may occur at the time of the user's request for access.

In some embodiments, the import/export module 204 may be configured to receive a first content object from a database or an application external to the system (possibly operated by a third-party and external to the system). The import/export module 204 may be further configured to collect information regarding or associated with the first content object, such as metadata, embedded annotations, and embedded links, which can be optionally utilized in the creation/importation of links, annotations, or category tags that are native to and/or compatible with functions of various embodiments. Additionally, the import/export module 204 may be configured to index the first content object for access and linking by a user (e.g., add the first content object to an index of electronic material available for access and linking), and provide the first content object to a content object management module 212 for management. The import/export module 204 may be configured such that upon a user's request, a web page may be captured from a selected website (e.g., user provides a universal resource locator [URL]) and imported into the system for preservation, possibly in association with a particular project (e.g., associated with a particular virtual workspace). In doing so, some systems facilitate direct capture of web pages from the Internet. Once preserved in the system, the web page may be adapted for annotation, linking, and/or tagging within the system by one or more users (e.g., a team of users working on a project).

In some instances, the content object management module 212 may manage (and list as available to the users) content not stored on the content object system 100 but, rather, stored on a database or system separate and distinct from the content object system 100 (and possibly operated by a third-party, such as LexisNexis® or the U.S. Federal Court system). In such instances, a request for the content residing on the separate and distinct database or system may result in the content object management module 212 instructing the import/export module 204 to automatically import the requested material from the separate and distinct database or system. If necessary, the content object management module 212 may utilize the conversion module 106 to convert the content from a native format (e.g., format as it exists on the external database or application) to a format that is compatible with various functionalities of the content object system 100.

At step 304, the content object system 100 may index the content and/or content object, received at step 302, for access (e.g., viewing access) by a user. In some embodiments, the content object management module 212 or the import/export module 204 may index content and/or content object such that the content and/or content object is listed (e.g., through an interface provided by the GUI module 202) as available for access by the user. Additionally, in some embodiments, the content and/or content of the content object may be indexed to allow the search module 222 to locate the content object based on the object's content. Eventually, the imported content object may be to the content object management module 212 for management and storage.

At step 306, the content and/or content object system 100 may convert the content object from its native format (e.g., format of the object as it exists on the external database or application) to a format accessible through the content object system 100. In various embodiments, the conversion module 206 may be utilized to perform the conversion from the native format to a format accessible through the content object system 100. For example, where the content object is a Microsoft® Word file, the conversion module 206 may convert the content object to a PostScript Document Format (PDF) file, or an OpenOffice Writer file, which may be accessible by the user through a web-interface provided by the GUI module 202 (e.g., view the content object as an a PDF embedded in a webpage).

In some embodiments, the conversion module 206 may convert the content from a native format to a format that is sufficiently accessible to the users through the interface provided by the GUI module 202, a format that permits the link module 220 to create a link in association with the content object, a format that permits the annotation module 218 to create an annotation (or replay annotation) in association with another content object, and/or a format that permits the tagging module 214 to create a category tag and associate it with the content object or with a link or annotation contained in the content object. In order to access the separate and distinct database or system, the import/export module 204 may utilize the connector module 216 to establish a connection to the separate and distinct database or system.

For example, where the content object management module 212 lists a case opinion or a brief that is available through an external database operated by Westlaw®, a user may request to view the case opinion or brief, and the content object system 100 may be configured to present text-based files to users in a PostScript Document Format (i.e., as a PDF file). In such an example, (a) the content object management module 212 may receive the user's view request for the case opinion or brief through an interface provided by the GUI module 202; (b) the content object management module 212 may instruct the import/export module 204 to import the case opinion or brief from the external database; (c) the import/export module 204 may instruct the connector module 216 to establish a connection with the database and retrieve the case opinion or brief; (d) the import/export module 204 may utilize the conversion module 206 to convert the retrieve case opinion or brief from a native format to a format viewable through an interface provided by the GUI module 202; and (e) through an interface the GUI module 202 may present to the user the case opinion or brief in the viewable format.

The conversion module 206 may be configured to convert the content object (e.g., received through the import/export module 204) from a native format (e.g., format of the object as it exists on the external database or application) to a format that is viewable by the user through the system, that permits a link to be created between the first content object and a second content object (also referred to herein as a "link format"), that permits an annotation to be created and/or associated with a content object (also referred to herein as a "annotation format"), that permits a category tag to be created and/or associated with a content object (also referred to herein as a "tag format"), or that provides some combination thereof.

Through the connector module 216, the content object system 100 may access (i.e., import) the content from an external database (e.g., LexisNexis®, Westlaw®, or a web page on a website) or an external cloud-service (e.g., Microsoft® Office Live®, Dropbox, or Google® Docs).

At step 308, to organize the content and/or content object received and imported into the content object system 100, the content object system 100 may create a virtual workspace and associate the content and/or content object imported into the content object system 100 with the virtual workspace. As noted herein, the virtual workspace may relate to a project and/or matter that the user is currently working on (e.g., litigation, business transaction, or software development project), and the virtual workspace may be associated with another content object that relates to the same project and/or matter. To create, delete, or modify the virtual workspace, the content object system 100 may utilize the workspace management module 112, which may be further configured to associate the virtual workspace with the content object and/or the user.

Where the import/export module 204 collects information regarding or associated with the content and/or content object (e.g., metadata, embedded annotations, and embedded links), such information may be provided to the content object management module 212 for storage and/or association with the content object. Furthermore, where a newer version of the content and/or content object is imported into the system (e.g., the content object is updated at the database external to the system and, as a result, the updated content object is imported into the system), the import/export module 204 may carry over or remap any links, category tag, and/or annotations applied to or associated with the older version of the content and/or content object (e.g., by way of an embodiment) to the newer version of the content and/or content object.

At step 310, a link may be created to link the content object, imported into the content object system 100, and another content object, which may be imported into the content object system 100. In some embodiments, the link module 220 may be utilized to create, delete, or modify the link, and to associate the link with the imported content object. The link module 220 may further associate the link with an annotation, a category tag, or the user creating the link.

The link module 220 may be configured to create a link between the first content object and the second content object.

The link module may be further configured to generate a notification (e.g., via e-mail, SMS, or an alert/message presented internally in the system) when an action is performed in association with the link. For some embodiments, exemplary actions, which may cause the link module 220 to generate a notification, may include creating a link in association with a content object, removing the link from a content object or removing a link's association with a particular content object, associating an annotation with a link, a user responding to a link with an annotation, or associating a category tag with the link. In addition, the link module 220 may be further configured to generate a summary of links associated with a given content object (e.g., the first content object). Those skilled in the art will appreciate that a single content object may comprise links from some content of the content object to other content of the content object.

The GUI module 202 may be configured to present the link for use (e.g., traversal) by a user in association with the first content object or the second content object. In certain embodiments, the link presentation module may be configured to present the link for use by overlaying a first endpoint of the link over the first content object or overlaying a second endpoint of the link over the second content object. For some embodiments, the link presentation module may be part of a viewer module of the system, which may be configured to present the first content object to the user (possibly through a web-based interface), thereby allowing the user to access the first computer content object while using the link. Additionally, for some embodiments, the import/export module 204 may be further configured to index content of a content object, thereby enabling the link to be searched and located based on content of the content object associated with the link. A first endpoint of the link may terminate at a position in the first content object, and a second endpoint of the link originates in the second content object.

In various embodiments, a content object may be a media file, such an image, a video file, an audio file, a slide show presentation, or the like. Where a first content object is a media file, the link may be created such that a first endpoint of the link terminates at a position in the first content object, and a second endpoint of the link originates in a second content object. In some embodiments, the position in the first content object may be a time position. Additionally, the second endpoint of the link in the second content object may relate to the position in the first content object.

In some embodiments, the position in the first content object may be a coordinate position in the media content of the first content object, and the second endpoint of the link in the second content object may relate to the coordinate position in the first content object.

Where the first content object is a media file, converting the first content object for linking purposes may comprise dividing media content in the first content object into a set of media slices according to a predetermined time interval (e.g., 5 microseconds). Converting the first content object may further comprise saving each media content slice in the set of media content slices as a set of separate media files, wherein each media slice in the set of media slices corresponds to a separate media file in the set of separate media files. Each separate media file may correspond to a specific time span of media in the first content object. In accordance with some embodiments, creating the link between the first content object and the second content object may comprise: creating the link such that a first endpoint of the link terminates at a time position in the first content object, and the first endpoint of the link is associated with a separate media file in the set of separate media files that corresponds to the time position in the first content object. A second endpoint of the link may originate in the second content object. For some embodiments, the second content object may be a transcript file, and the second endpoint of the link in the second content object may be associated with a timestamp of the transcript file that corresponds to the time position in the first content object.

In some embodiments, creating the link between the first content object and the second content object may comprise associating a first endpoint of the link in the first content object with a first area in the first content object. In various embodiments, creating the link between the first content object and the second content object may comprise associating the second endpoint of the link in the second content object with a second area in the second content object.

At step 312, an annotation may be created and associated with the content object imported into the content object system 100. In various embodiments, the annotation module 218 may be utilized to create, delete, or modify the annotation, and to associate the annotation with the imported content object. The link module 220 may further associate the annotation with a link, category tag, or the user creating the annotation.

The annotation module 218 may be configured to create an annotation in association with the content object and to create a reply annotation in response to the annotation and associated with the annotation. The annotation module 218 may be further configured to add the reply annotation to a thread of reply annotations associated with the annotation. For some embodiments, the thread of reply annotation may comprise a chain of reply annotations that relate to an original annotation associated with the content object or a link having an endpoint in the content object. The annotation may be created at a first request by a first user, and the reply annotation may be created at a second request by a second user. In this way, a first user may add an annotation to a content object and one or other users may add their own annotations in response to the first user's annotation. These reply annotations may be composed into a thread of reply annotations, which may function as a live discussion/conversation regarding a content object.

Once an annotation is added and associated with a content object, the annotation may be associated with a position in the content object. Depending on the embodiment, the position may relate to a content area (e.g., shape of area, a textual string, a body of text, a character string, or a token string) in the content object, the position relates to a time position in the content object (e.g., where the content object is a media file), or the position relates to a timestamp in the content object (e.g., where the content object is a transcript file).

The GUI module 202 configured to present the annotation (e.g., for review or modification by a user) in association with the content object. For various embodiments, the GUI module 202 and/or the annotation module 218 may be configured to present the annotation by overlaying the annotation over a position in the content object, wherein the position is associated with the annotation. In some embodiments, the GUI module 202 and/or the annotation module 218 may be configured to present the content object to one or more users (possibly through a web-based interface), thereby allowing the user(s) to access the content and/or content object(s) while reviewing or modifying the annotation. For certain embodiments, content indexing performed by the import/export module 204 may enable the annotation to be searched and located based on content of the content object associated with the annotation.

At step 314, a category tag may be created and associated with the content object imported into the content object system 100. In some embodiments, the tagging module 214 may be utilized to create, delete, or modify the category tag, and to associate the category tag with the imported content object. The tagging module 214 may further associate the category tag with an annotation, a link, or a user creating the category tag.

At step 316, the content and/or content object may be presented to the user for access, in a format that is accessible by the user through an interface. As noted herein, for some embodiments, the GUI module 202 may provide the user with the interface (e.g., web-based interface or application interface) through which the user can access (e.g., view or modify) the content and/or content object imported into the content object system 100.

As noted herein, in some embodiments, the access management module 208 may control the user's ability to access, link, annotate, or tag content and/or content objects through an interface provided by the GUI module 202. In some embodiments, the access management module 208 may exercise access control to content objects by interacting with the content object management module 212, may exercise control over linking through interactions with the link module 220, may exercise control over annotations through interactions with the annotation module 218, and may exercise control over tagging through interactions with the tagging module 214. Additionally, in some embodiments, the access management module 208 may manage and provide credentials that may be needed by the connector module 216 when establishing a connection with a database or an application (e.g., cloud-based) external to the content object system 100 (e.g., LexisNexis®, Westlaw® or PACER login credentials).

In various embodiments, the content object management module 212 may be configured to manage storage of content objects that are accessed and/or linked through the system.

Though the steps of method 300 may be depicted and described in a certain order, those skilled in the art will appreciate that the order in which the steps are performed may vary between embodiments. Those skilled in the art will also appreciate that the components described above with respect to the method 300 are merely examples of components that may be used with the method 300, and that other components may be utilized in some embodiments.

Figure 4:
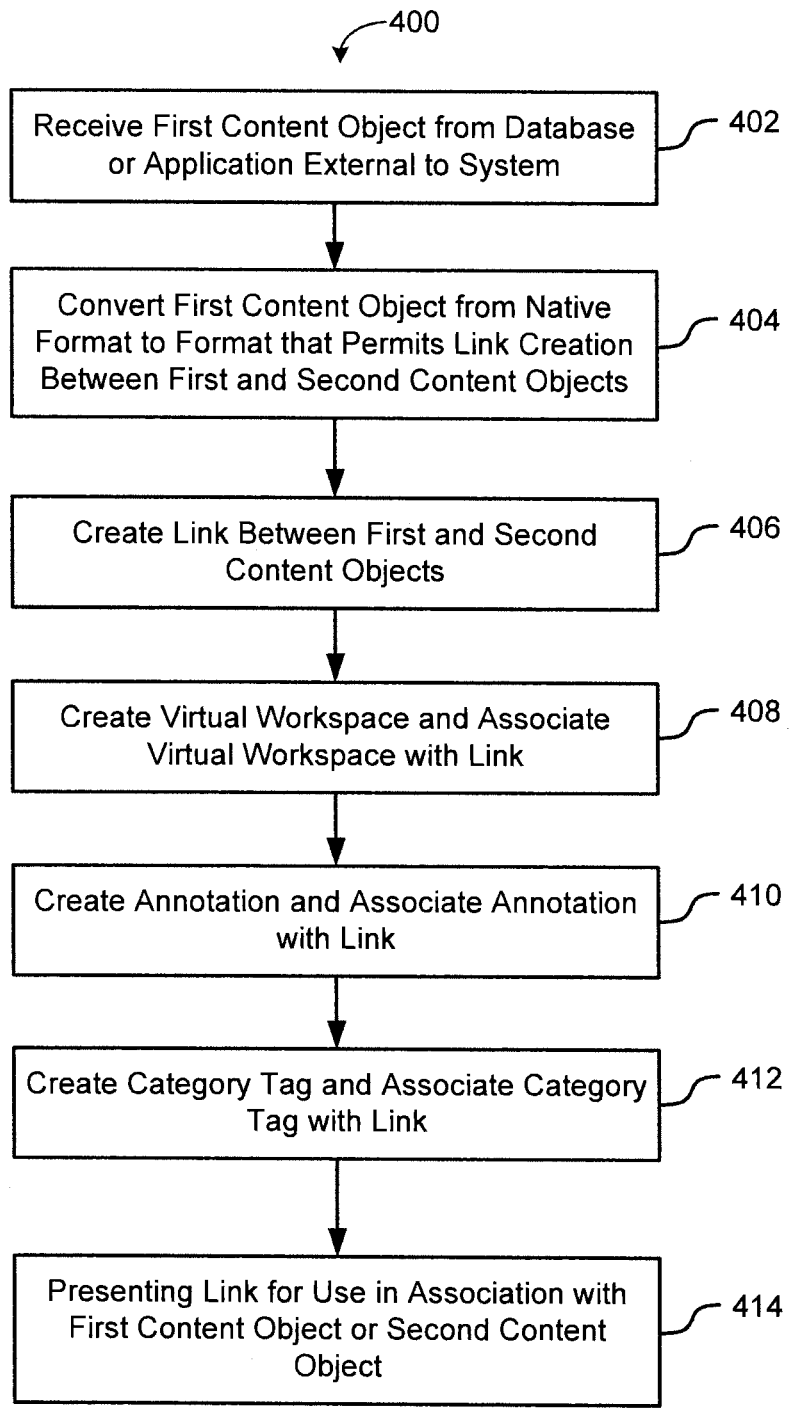
FIG. 4 depicts a flowchart illustrating an exemplary method for linking a content object in accordance with some embodiments.

FIG. 4 depicts a flowchart illustrating an exemplary method 400 for linking content and/or a content object in accordance with some embodiments. At step 402, the content object system 100 may receive a first content object from a database or an application external to the content object system 100.

The first content object may be one that a user requests to access (e.g., request to view or modify the first content object, or create, delete, or modify a link between the first and a second content object). In some embodiments, the connector module 216 may establish a connection with the external database or application. The import/export module 204 may retrieve the first content object. As noted herein, the retrieval of the content object may occur at the time of the user's request for access or linking.

In addition to receiving the first content object, the content object system 100 may also index the first content object for access (e.g., viewing or modification access) by a user. For some embodiments, the content object management module 212 or the import/export module 204 may index the first content object such that the first content object is identified (e.g., through an interface provided by the GUI module 202) as available for access by the user. Additionally, in some embodiments, content of the content object may be indexed to permit the search module 222 to locate the content or content object based on the content. Eventually, the first content object may be submitted to the content object management module 212 for management and storage.

At step 404, the content object system 100 may convert the first content object from its native format (e.g., format of the object as it exists on the external database or application) to a link format that permits a link to be created between the first content object and a second content object. In particular embodiments, the link format will permit a user to create, delete, or modify links (between the first and second content objects) through an interface provided by the GUI module 202. For some embodiments, the conversion module 206 may perform the conversion from the native format to the link format. The conversion module 206 may convert the first content object, or the second content object, such that they are generally accessible (e.g., viewable) through the content object system 100. For instance, where the content object is a Microsoft® Word file, the conversion module 206 may convert the content object to a PostScript Document Format (PDF) file, or an OpenOffice Writer file, which may be accessible by the user through a web-interface provided by the GUI module 202 (e.g., view the content object as an a PDF embedded in a webpage).

At step 406, a link may be created between the first content object and the second content object (e.g., between content of the first content object and content of the second content object). In some embodiments, the link module 220 may create, delete, modify, and/or associate the link with the imported content object. The link module 220 may further associate the link with an annotation associated with the first content object, a category tag associated with the first content object, or the user creating the link. In some instances, the first content object, the second content object, or both may be under the management of the content object management module 212. The link created between the first and second content objects may be a one-way link, a two-way link (also referred to as a cross-link), a one-to-many link, or some combination thereof (e.g., two-way, one-to-many link). For some embodiments, the two-way link may be implemented using two one-way links between two link endpoints.

With respect to endpoints, the link created may comprise an endpoint that is embedded into the first content object or an endpoint that is overlaid over the content area of the content object. Furthermore, the type of data contained in the first content object may determine how a link endpoint is associated with the first content object. In particular, where the first content object contains text and/or image content, the endpoint of the link may be associated with a point or area within such content. For instance, where the first content object is a word processing file containing textual content, the endpoint may be associated with a section, text string, or page of the first content object.

In the case where the first content object contains video or audio content, the endpoint may be associated with a particular time position in the content's timeline. Accordingly, when the link is traversed from the other endpoint of the link in the second content object, the media content may be opened through the content object system 100 to that particular time position. In another example, where the first content object contains static imagery content and the link is a one-to-one link between the first content object and a second content object, an endpoint of the link in the first content object may be a particular coordinate position of the media content. Eventually, when the link is traversed from the other endpoint of the link in the second content object, the media content may be opened through the content object system 100 to that particular coordinate position.

At step 408, to organize the first content object, and organize any links created through the content object system 100 for the first content object, the content object system 100 may create a virtual workspace, associate the link created at step 406 with the virtual workspace, and optionally associate the first content object and/or the second content object with the virtual workspace as well. As noted herein, the virtual workspace may relate to a project and/or matter that the user is currently working on (e.g., litigation, business transaction, or software development project), and the virtual workspace may be associated with other content objects, links, annotations, or category tags that relate to the same project and/or matter. To create, delete, or modify the virtual workspace, the workspace management module 112 may be further configured to associate the virtual workspace with the first content object, one or more users, links, annotations, or category tags.

At step 410, an annotation may be created (e.g., in association with the first content object or the second compute readable content object) and associated with the link created at step 406. In various embodiments, the annotation module 218 may be utilized to create, delete, modify, and/or associate the annotation with the link. The annotation module 218 may further associate the annotation with a category tag, or the user creating the annotation.

At step 412, a category tag may be created and associated with the link created at step 406. In some embodiments, the tagging module 214 may create, delete, modify, and/or associate the category tag with the link. The tagging module 214 may further associate the category tag with an annotation, a link, or the user that is creating the category tag.

At step 414, the first content object, and any links, annotations, or category tags associated thereto, may be presented to the user for access in a format that is accessible by the user through an interface. As noted herein, for some embodiments, the GUI module 202 may provide the user with the interface (e.g., web-based interface or application interface), through which the user can access (e.g., view or modify) the first content object imported into the content object system 100, or create, delete, modify, or access links between the first content object and other content objects.

Though the steps of method 400 may be depicted and described in a certain order, those skilled in the art will appreciate that the order in which the steps are performed may vary between embodiments. Those skilled in the art will also appreciate that the components described above with respect to the method 400 are merely examples of components that may be used with the method 400, and that other components may be utilized in some embodiments.

Figure 5:
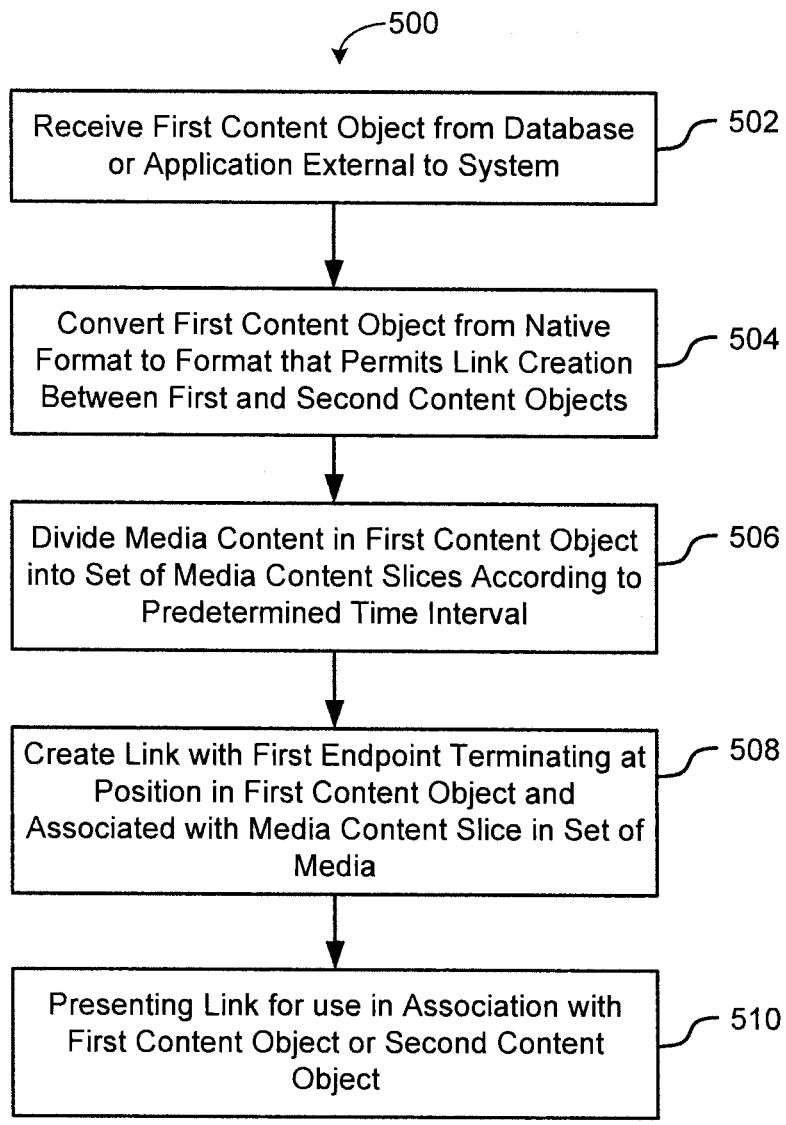
FIG. 5 depicts a flowchart illustrating an exemplary method for linking a computer readable content containing media content in accordance with some embodiments.

FIG. 5 depicts a flowchart illustrating an exemplary method 500 for linking a computer readable content containing media content in accordance with some embodiments. At step 502, the content object system 100 may receive a content object from a database or an application external to the content object system 100. As described herein, the content object may be received upon a user request to access the content object, or request to create, delete, or modify a link between the content object and another content object. In accordance with some embodiments, the connector module 216 may establish a connection with an external database or application. The import/export module 204 may retrieve the first content object for the content object system 100. As noted herein, the retrieval of the content object may occur at the time of the user's request for access or linking.

At step 504, the content object system 100 may convert the content object from its native format (e.g., format of the object as it exists on the external database or application) to a link format that permits a link to be created between the content object and a second content object. Under the link format, a user may create, delete, or modify links between the content objects through an interface provided by the GUI module 202. Depending on the embodiment, the conversion module 206 may be utilized to perform the conversion from the native format to the link format, and convert the content object, or the second content object, such that they are generally accessible (e.g., viewable) through the content object system 100.

In some embodiments, the first content object contains media content. At step 506, the media content in the first content object may be divided into a set of media content slices (e.g., each medic content slice is a separate media file) according to a predetermined time interval (e.g., 5 microsecond intervals). For some embodiments, the conversion module 206 may divide the media content in the first content object. By dividing the media content in a content object into media content slices (e.g., audio, video, or audio/video chunks, such as small media files) according to predetermined time intervals, the media content slices (e.g., small media files) can facilitate accurate/precise linking into the media content of the content object from another content object (or possibly the same content object). The predetermine time intervals may be set by a user or administrator. Generally, the smaller the predetermined time interval, the more granular the media slices (i.e., smaller the media chunks).

In various embodiments, the content object system 100 may automatically (or manually) perform the importation and conversion processes at or near the time when the user requests access to a content object (i.e., importation and conversion is performed just-in-time for viewing). The system may import, convert, and persistently store the content object for online and offline access, linking, annotation, or tagging by the user, where the online access, linking, annotation, or tagging may occur when the source of the content object (i.e., the database or the application) is accessible by the system, and where offline access linking, annotation, or tagging may occur when the source of the content object is inaccessible. Alternatively, the system may import, convert, and temporarily store (i.e., temporary caching) the content object for online access, linking, annotation, or tagging by the user.

For some embodiments, the content object system 100 may perform the importation and conversion processes in advance of the user requesting access, linking to the content object (e.g., when the content object has been manually imported into the system in advance of the user's access or linking request), annotating the content object, or tagging the content object, link, or annotation. In addition, the importation and conversion processes may be performed by an explicit user instruction or according to a predetermined schedule (e.g., hourly, daily, monthly, etc.). Those skilled in the art will appreciate that where the format of the content object is already compatible for access, linking, linking or category tagging through the system, the system may skip the conversion process altogether. Furthermore, the format utilized by the system for access, linking, linking or category tagging may differ based on the type of electronic material to be converted. For example, content objects that are text-based (e.g., such as word processing documents and spreadsheets) and/or based on static images (e.g., slide shows) may be uniformly converted to the viewable format of PostScript Document Format (PDF). In another example, content objects that are a particular audio format, such as MPEG Layer-3 Audio (MP3), Waveform Audio Format (WAV), or Windows Media Audio (WMA), may be reformatted to Ogg Vorbis (OGG).

To access the content object on the database or the application external to the system, the system may comprise a connector module 216 configured to access the database or the application and then retrieve the content object from the database or the application. In some embodiments, the connector module 216 may access the database or the application for the content object when the user requests to access the content object through the system, and may access the database or the application over a network (e.g., the Internet). Access to the database or application may be web-based and may be comprise a web page (e.g., accessible as a web site).

In particular embodiments, the system may comprise an access management module 208 configured to control access to the content and/or content object, one or more links associated with the content object, one or more annotations associated with the content object, and/or one or more category tags associated with the content object. Those skilled in the art will appreciate that access to a content object may include adding, deleting, or modifying the content object. Likewise, those skilled in the art will appreciate that access to a link, an annotation, or a category tag may include adding, deleting, or modifying the link (e.g., associating the link with a content object, associating the link with an annotation, or responding to the annotation with another annotation), the annotation (e.g., creating and associating a link with a content object), or a category tag (e.g., associating a category tag with a link or an annotation).

At step 508, a link may be created with a first endpoint terminating at a position in the first content object and associated with a particular media content slice in the set of media content slices. The dividing the media content into smaller media slices in step 506 may allow for more accurate/precise linking into the media content of the content object. Additionally, by using media content slices, rather than the media content as a whole, some embodiments enable users at client-side interfaces to traverse a link to a time position in media content and start playing the media content at that time position, without requiring the client-side access device (e.g., client computer) to buffer those portions of the media content that reside before the time positions. In essence, such embodiments may enable almost immediate playback of media content.

In one example, where the media content corresponds to a transcript (e.g., a transcript that corresponds to a deposition audio or video recording), smaller media slices permit precision links to be created from timestamp positions in the transcript to corresponding time positions in the media content (e.g., audio or video recording). In some embodiments, when such precision links are used (e.g., opened or traversed) by a user, the particular media content slice that closest corresponds to the timestamp of the link is opened and played, and the media content slices that follow the particular media content slice are sequentially opened and played. Depending on the embodiment, when a transcript is received by the content object system 100, the conversion module 206 may automatically create links between timestamp positions in the transcript and the time positions in media content that corresponds to the transcript.

In the court context, the content object containing media content may be in a STR format, comprising four audio channels. The content object containing media content may be in a compressed audio format that can readily be manipulated or "chopped" into media content slices.

At step 510, the first content object, and any links, annotations, or category tags associated thereto, may be presented to the user for access in a format that is accessible by the user through an interface. As noted herein, for some embodiments, the GUI module 202 may provide the user with the interface (e.g., web-based interface or application interface), through which the user can access (e.g., view or modify) the first content object, or create, delete, or modify links between with the first content object and other content objects.

Though the steps of method 500 may be depicted and described in a certain order, those skilled in the art will appreciate that the order in which the steps are performed may vary between embodiments. Those skilled in the art will also appreciate that the components described above with respect to the method 500 are merely examples of components that may be used with the method 500, and that other components may be utilized in some embodiments.

Figure 6:
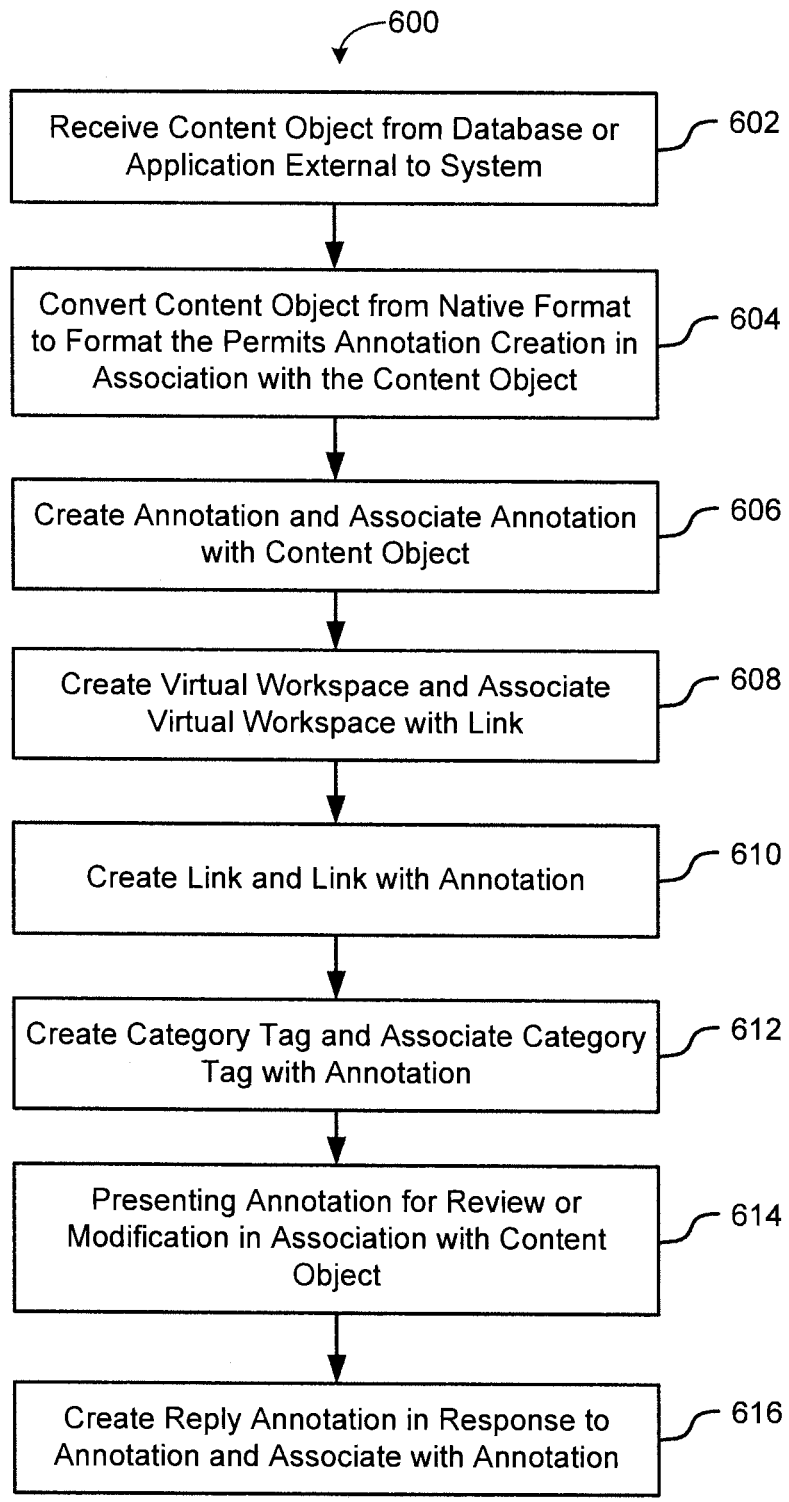
FIG. 6 depicts a flowchart illustrating an exemplary method for annotating a content object in accordance with some embodiments.

FIG. 6 depicts a flowchart illustrating an exemplary method 600 for annotating a content object in accordance with some embodiments. At step 602, the content object system 100 may receive a first content object from a database or an application external to the content object system 100. The first content object may be one that a user requests to access (e.g., request to view or modify the first content object, or create, delete, or modify a link between the first and a second content object). In some embodiments, the connector module 216 receives the content object and establishes a connection with the external database or application. The import/export module 204 may retrieve the content object for the content object system 100. As noted herein, the retrieval of the content object may occur at the time of the user's request for access or linking.

At step 604, the content object system 100 may convert the content object from its native format (e.g., format of the object as it exists on the external database or application) to an annotation format that permits an annotation to be created in association with the content object.

At step 606, an annotation may be created and associated with a computer readable object with the content object. In some embodiments, the annotation module 218 may create, delete, modify, and/or associate the annotation with the imported content object. The annotation module 218 may further associate the annotation with a link associated with the content object, a category tag associated with the content object, or the user creating the annotation. The annotation created in associated with the content object may be notes and/or comments associated with the entire content object, a particular portion of the content object (e.g., content area, text string, or body of text), a link, or a category tag. Exemplary annotations may include text-based comments, image-based comments, or markups overlaid over the content object. Where the annotation is a text-based comment, the textual content of the annotation may include one or more embedded links associated with resources internal or external to the content object system 100.

When viewing annotations associated with a particular content object, the annotations may be overlaid over the content area of the content object that relates to the annotation. In addition, the annotations associated with a particular content object may be shown to be separate from the content of the content object. The annotation associated with a portion of the content area of a content object may be displayed or hidden.

At step 608, to organize the content object, and organize any annotations created through the content object system 100 for the content object, the content object system 100 may create a virtual workspace and associate the annotation created at step 606 with the virtual workspace and, optionally, associate the content object with the virtual workspace as well. As noted herein, the virtual workspace may relate to a project and/or matter that the user is currently working on (e.g., litigation, business transaction, or software development project), and the virtual workspace may be associated with other content objects, links, annotations, or category tags that relate to the same project and/or matter. To create, delete, or modify the virtual workspace, the workspace management module 112 may associate the virtual workspace with the content object, one or more users, links, annotations, or category tags.

At step 610, a link may be created in association with the content object and associated with the annotation created at step 606. For some embodiments, the link module 220 may be utilized to create, delete, modify, and/or associate the annotation with the link. The link module 220 may further associate the link a category tag, or the user creating the link.

At step 612, a category tag may be created and associated with the annotation created at step 608. For some embodiments, the tagging module 214 may create, delete, or modify the category tag, and to associate the category tag with the annotation. The tagging module 214 may further associate the category tag with a link, or the user that is creating the category tag.

At step 614, the content object, and any links, annotations, or category tags associated thereto, may be presented to the user for access in a format that is accessible by the user through an interface. As noted herein, for some embodiments, the GUI module 202 may provide the user with the interface (e.g., web-based interface or application interface), through which the user can access (e.g., view or modify) the content object imported into the content object system 100, or create, delete, modify, or access annotations associated with the content object.

Upon presentation of the content object with the associated annotation (hereafter, the "original annotation"), a reply annotation may be created at step 616, in response to the original annotation. During step 616, the reply annotation may be further associated with the original annotation. The creation and association functions involving reply annotations may be facilitated by the annotation module 218.

As noted herein, the ability to create reply annotation in response to preexisting annotations associated with the content object may facilitate, amongst two or more users (e.g., a team of users working on a project), an on-going discussion/conversation regarding a particular annotation associated in the content object. In various embodiments, the reply annotation may be created in response to, and associated with, a link having an endpoint associated with the content object.

When associating a reply annotation with a particular annotation or link, the annotation module 218 may maintain the reply annotations in a thread of reply annotations associated with the particular annotation or link. Depending on the embodiment, a given annotation or link may have two or more associated threads of reply annotations, whereby each thread of reply annotation functions as a separate discussion/conversation regarding the given annotation or link. When presenting the content object and its associated annotations and/or links, the GUI module 202 may also present the reply annotations associated with those annotations and/or links.

Though the steps of method 600 may be depicted and described in a certain order, those skilled in the art will appreciate that the order in which the steps are performed may vary between embodiments. Those skilled in the art will also appreciate that the components described above with respect to the method 600 are merely examples of components that may be used with the method 600, and that other components may be utilized in some embodiments.

Figure 7:
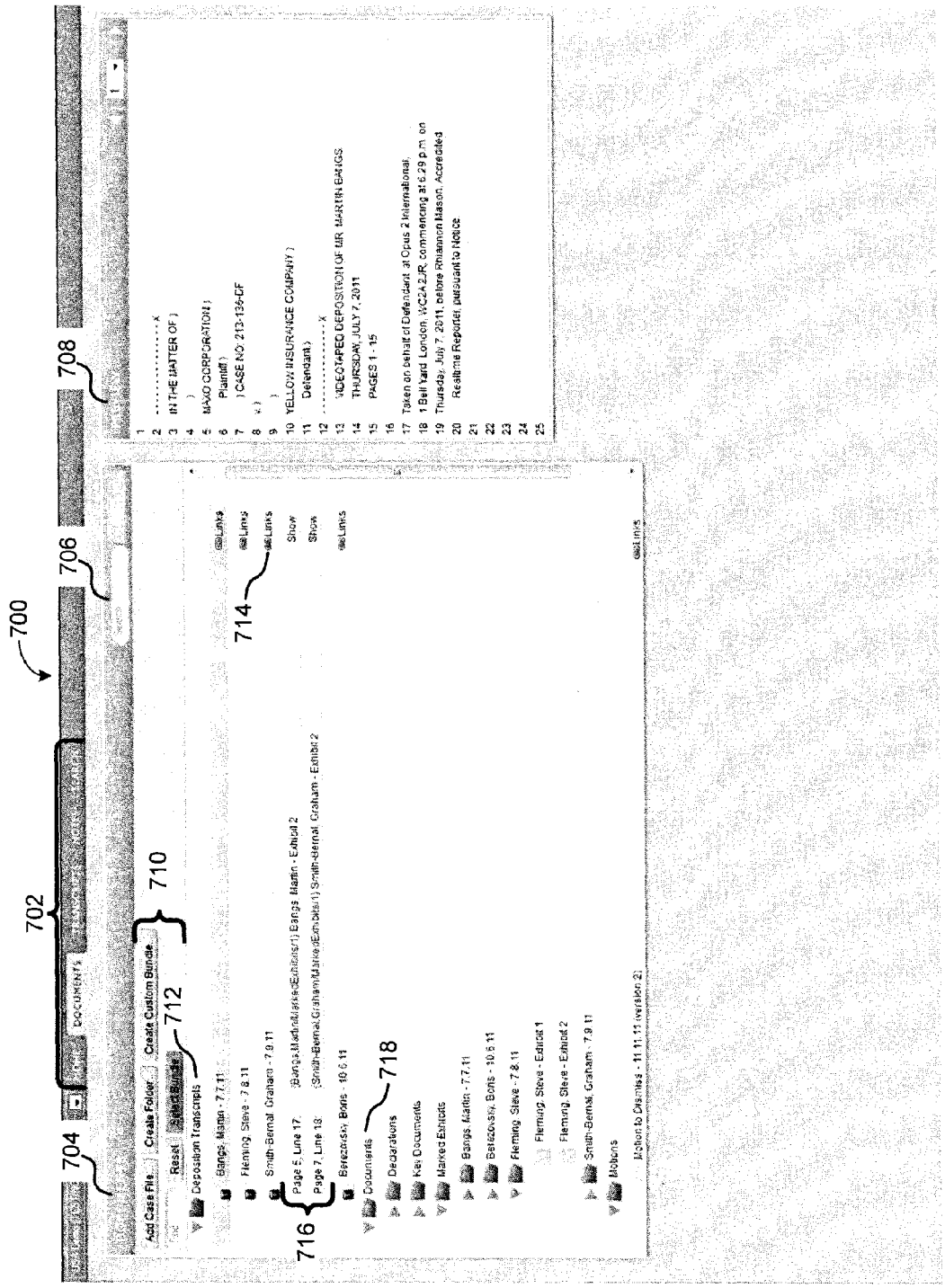
FIG. 7 depicts a screenshot of an exemplary web-interface for accessing content objects and links associated with the content objects in accordance with some embodiments.

FIG. 7 depicts a screenshot of an exemplary web-interface 700 for accessing content objects and links associated with the content objects in accordance with some embodiments. In some embodiments, the web-interface 700 may be generated and provided to a user (e.g., at a client computing device) by a GUI module 202.

Through the web-interface 700, a user may review a listing of content objects available for access through an embodiment, and review links associated those content objects. In some embodiments the listing of available content objects may be provided by the content object management module 212, and the links associated with the content objects may be provided by the link module 220. As described herein, for some embodiments, the content object listed may be those imported and already residing with a computer content object access system, or may be those available residing at a database or an application external to the content objects access system. Additionally, where the listed content object resides at a database or an application external to the embodiment, such content objects may need to be imported and/or converted before being access through the computer content object access system by a user.

A menu bar 702 may allow a user traverse different interfaces provided by a computer content object access system (e.g., via the GUI module 202). Such interfaces may include, for example, an interface 704 for documents (which are active and shown in FIG. 7), an interface for transcripts, an interface for notes/annotations, and an interface for searching content objects such as text-based documents, or links, annotations, category tags, or users associated the content objects access system.

For the document interface 704 shown in FIG. 7, a user may search for content objects, or links, annotations, category tags, or users associated therewith, through a search field 706. The document interface 704 may also provide a preview 708 of for one or more documents listed in document listing 704. To provide further organization of documents, the document interface 704 may allow a user to bundled documents and/or store documents to a particular folder using buttons 710. For example, under folder 712, the document interface 704 may list "Deposition Transcripts" that are available for access through the content objects access system, and under folder 718, the document interface 704 may list general documents that are available for access through the content objects access system. Additionally, for each document listed, the document interface 704 may provide a listing 716 of links (e.g., provided by the link module 220) associated and/or used in the listed documents. The links displayed in the listing 716 may be traversed from the listing 716. In addition, displaying or hiding the listing 716 in the document interface 704 may be facilitated through a link display toggle 714.

Figure 8:
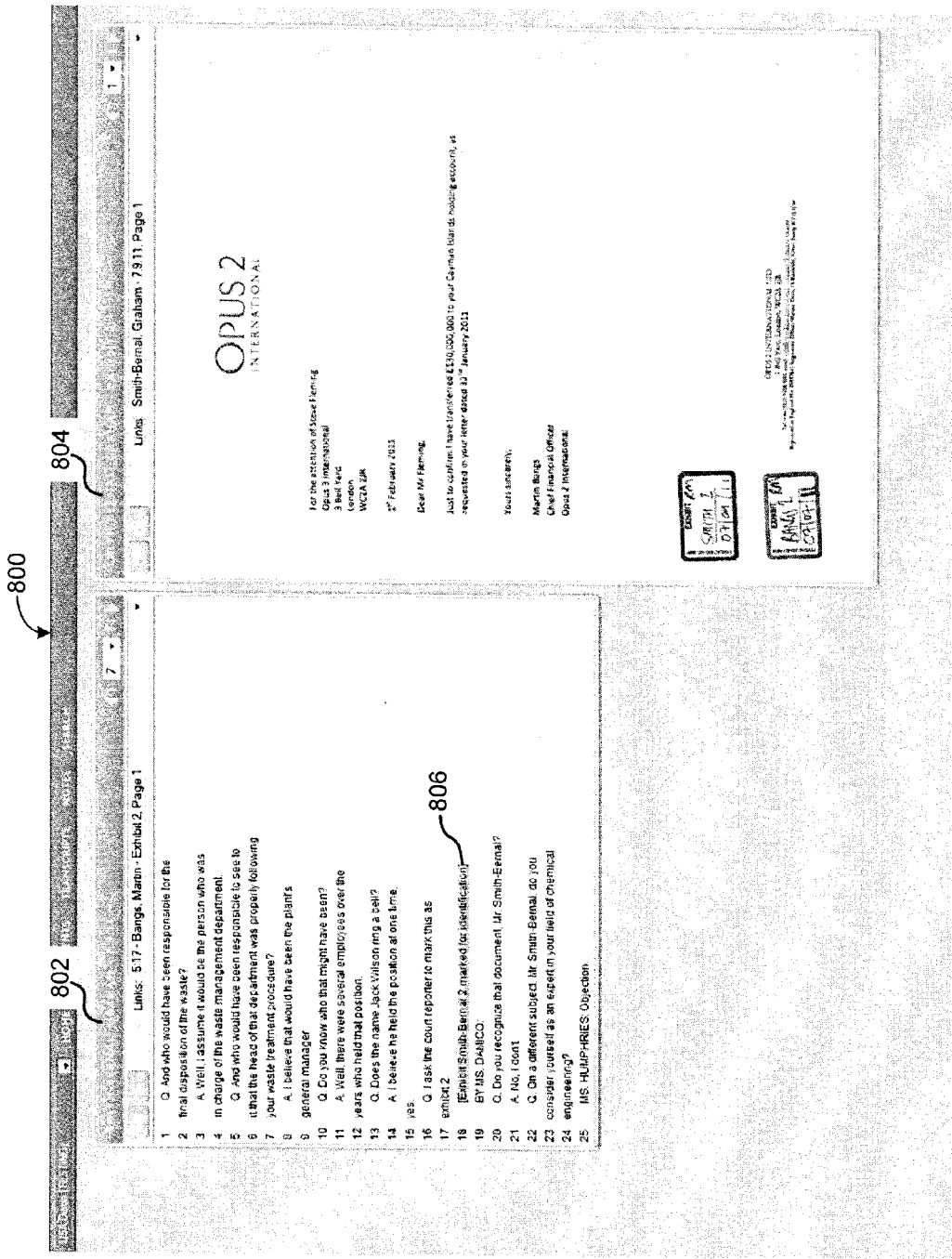
FIG. 8 depicts a screenshot of an exemplary web-interface for accessing a content object in accordance with some embodiments.

FIG. 8 depicts a screenshot of an exemplary web-interface 800 for accessing a content object in accordance with some embodiments. In some embodiments, the web-interface 800 may be generated and provided to a user (e.g., at a client computing device) by a GUI module 202.

With web-interface 800, a user may select to view a first document in a first display 802 and view, in a second display 804, a second document associated with the document of the first display 802. As noted herein, in some embodiments, a link may be created (e.g., using the link module 220) between a content object and another content object. In the case of FIG. 8, a link 806 accessed by a user in the first document resulted in the display of the second document that is associated with the link 806. The side-by-side presentation of a first display 802 and the second display 804 may permit a user to quickly review links present in the first document being displayed in the first display 802 and, without ever having to leave the first document, open the target content objects of those links in the second display 804 (i.e., as the "second document").

Figure 9:
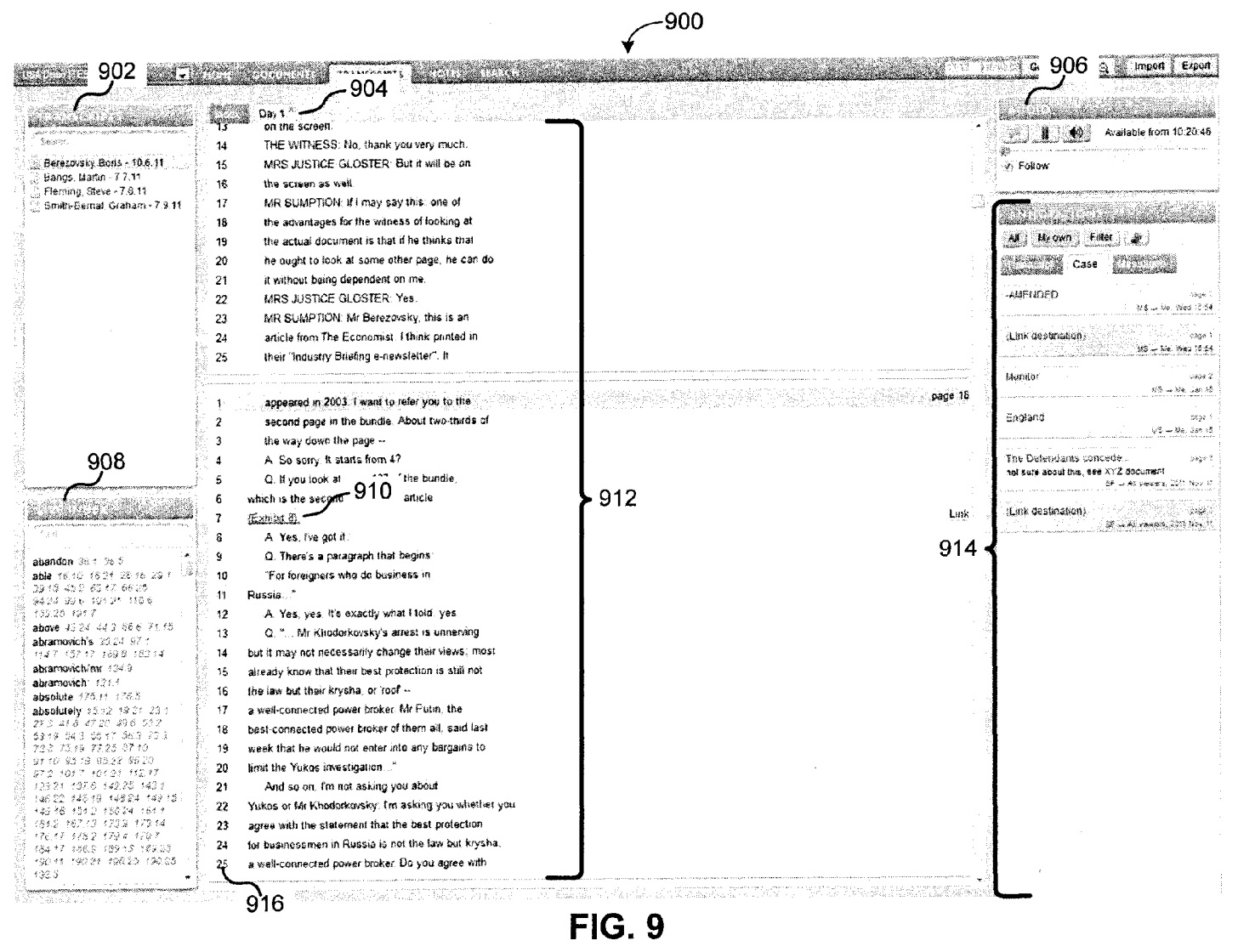

FIG. 9 depicts a screenshot of an exemplary web-interface 900 for accessing a transcript having links and annotations associated with the transcript in accordance with some embodiments. In some embodiments, the web-interface 900 may be generated and provided to a user (e.g., at a client computing device) by a GUI module 202. To provide easy access to transcripts available through the content objects access system, the web-interface 900 may provide a listing 902 of transcripts available for access and also provide functionality for searching the listing. Additionally, using tab interface 904, the web-interface 900 may organize the transcripts according to time and date on which the transcripts were taken and may provide an index the transcripts related to a particular event (e.g., deposition).

The transcript may be presented for viewing through display 912, with each line of each page of the transcript being numbered. In some embodiments, each line number (in the column of line numbers 916) may be overlaid with a timestamp that corresponds to a time position in a media file (e.g., audio, video, or slide show presentation), such that at the time position, the media content of the media file is substantially in synch with what is transcribed in the transcript at the line number. Take for instance, where the transcript is associated with an audio file or a video file that records a deposition proceeding, and one or more transcripts provide a textual account of what is spoken or heard during the deposition proceeding. Depending on the embodiments, the timestamp overlaid in the transcript may be presented on the transcript when a user selects a line or a line number on the transcript, or when a user positions a cursor (e.g., mouse cursor) over a line or line number of the transcript. Then, when the user selects the line or line number, the related audio file or video file may be opened, queued to the time position corresponding to timestamp of the line number, and, in some embodiments, commence playing. For some embodiments, the system may open and play the audio or video file using a media player 906. The media file associated with the transcript may be one that is imported into the system and converted (e.g., broken into media content slices via method 500 of FIG. 5) for precise time synchronization with transcripts and/or for precise time linking without the need for substantially buffering the media file.

The web-interface 900 may also provide an index of terms 908 found in the transcript currently selected by the user. In some embodiments, by selecting a term listed in the index of terms 908 may cause the transcript presented in the display 912 to reposition to the location that corresponds to the term selected.

The transcript shown in the display 912 may contain links to other content objects external to the shown transcript, which may already be under the management of the content object system 100 and the content object management module 212, or may be imported into the content object system 100 via the import/export module 204. The link may be created in the transcript using the link module 220. In FIG. 9, the user's traversal of link 910 may cause the corresponding content object "Exhibit 8" to open in a separate window, or may cause the web-interface 900 currently being shown to be replaced with an interface showing "Exhibit 8."

To provide easy access or fast a summary of annotations in web-interface 900, annotations display 914 may provide a listing of annotations, which may be associated with the current transcript shown or may be associated with the virtual workspace to which the current transcript is associated. The annotations shown in display 914 may be filtered according to user ownership of the annotations, association with category tags, associations to other computer readable objects, or association with links.

FIG. 10 depicts a screenshot of an exemplary web-interface 1000 for accessing a content object having a link, an annotation, or a category tag in accordance with some embodiments. In some embodiments, the web-interface 1000 may be generated and provided to a user (e.g., at a client computing device) by a GUI module 202.

The web-interface 1000 may allow a user to access the text or image-based content of a content object, and may further permit a user to create, delete, modify, or use links, annotations, and/or category tags in association with a content object. The web-interface 1000 presents the content of the content object in display 1002. Where the links, annotations, and/or category tags are associated with particular portions of the content in the content object, such portions may be accordingly marked with visual indicators (e.g., shading, coloring, or transparent overlays). For example, in FIG. 10, visual indicators 1004 and 1006 may correspond to links, annotations, and/or category tags associated with those portions of content shown in the display 1002. When a user selects the marked content portions, or when a user positions a cursor (e.g., mouse cursor) over the marked content portions, the GUI module 202 may subsequently present user interfaces (e.g., windows, dialog boxes, etc.) that facilitate creation, deletion, modification, or usage of the links, annotations, and/or category tags associated with those content portions.

FIG. 11 depicts a screenshot of an exemplary web-interface 1100 for accessing a content object having annotations showing in accordance with some embodiments. In FIG. 11, the web-interface 1100 presents the content of the content object in display 1102 with associated annotations 1104 and 1108 shown.

For annotations associated with particular portions of content, the display 1102 may mark the particular portions with visual indicators (e.g., shading, coloring, or transparent overlays). With respect to FIG. 11 in particular, the display 1102 uses visual indicators 1004 and 1006 to mark portions of the content object that are related to the annotations 1104 and 1108, respectively. The display 1102 presents the annotations 1104 and 1108 over the content of the content object, and in close proximity to the visual indicators 1004 and 1006. Each of the annotations 1104 and 1108, when presented by the display 1102, may list the text-based or image-based content contained therein, may list the one or more category tags its associated with, may list the one or more users its associated with (e.g., the users who created respective annotations), and may list the time and date it was created or last modified. Additionally, in certain embodiments, when the annotations 1104 and 1108 are presented, they may adopt visual characteristics (e.g., coloring, shading, or shape of visual indicator) of the one or more category tags associated with the annotations 1104 and 1108. A user may choose to hide or display the annotations 1104 and 1008 over the content upon user selection, or when a user positions a cursor (e.g., mouse cursor) over the visual indicators 1004 and 1006, which correspond to the associated content portions. In some embodiments, the presentation of the annotations 1104 and 1108 may include presenting, or providing access to, any reply annotations created in response to the annotations 1104 and 1108. The presentation of reply annotation may further include presenting any threads of reply annotations associated with the annotations 1104 and 1108. For some embodiments, the presentation of reply annotation related to the annotations 1104 and 1108 may be over the content area or in a separate display.

Figure 12:
FIG. 12 depicts a screenshot of an exemplary web-interface for accessing a content object and modifying links, annotations and category tags in accordance with some embodiments.

FIG. 12 depicts a screenshot of an exemplary web-interface 1200 for accessing a content object and modifying links, annotations and category tags in accordance with some embodiments. In some embodiments, the web-interface 1200 may be generated and provided to a user (e.g., at a client computing device) by a GUI module 202, and may allow a user to interact with the content object management module 212, the link module 220, the annotation module 218, and/or the tagging module 214. The web-interface 1200 may allow a user to access the text or image-based content of a content object, and may further permit a user to create, delete, modify, or use links, annotations, and/or category tags in association with a content object. In FIG. 12, the web-interface 1200 presents the content of the content object in display 1202 with associated annotations 1206 and 1210 shown. Also shown are visual indicators 1208 and 1216, which correspond with the annotations 1206 and 1210.

In order to edit the annotation 1206, or create a reply annotation in response to annotation 1206, a user may select the desired action from menu 1204, which as shown is specifically relates to the annotation 1206. In order to perform identical functions for the annotation 1210, a similar menu may be presented in connection with annotation 1210. In connection with the annotation 1210, a user may choose to configure user access to the annotation 1210 using fields 1214. A user may further choose to have system 100 send notifications regarding the annotation 1210 (e.g., actions performed in connection with the annotation 1210, such as the creation of a reply annotation or the deletion of the annotation 1210) to those listed in the fields 1214 when an option associated with annotation 1210 is selected. The textual content of the annotation 1210 may be modified via text field 1218. Category tags 1222 associated with the annotation 1210 may be changed via button 1212, and link 1210 associated with the annotation 1210 may be changed via button 1228. Those skilled in the art will appreciate that other aspects of an annotation may be configured in a similar manner, and that the aspects shown to be configured in FIG. 12 may be configured using alternative techniques.

FIG. 13 depicts a screenshot of an exemplary web-interface 1300 for accessing a content object and creating links, annotations, and category tags in association with content areas in accordance with some embodiments. The web-interface 1300 may allow a user to access the text or image-based content of a content object, and may further permit a user to create, delete, modify, or use links, annotations, and/or category tags in association with a content object. In FIG. 13, the web-interface 1300 presents the content of the content object in display 1304. The web-interface 1300 illustrates how a large portion of content area 1302 of the content object may be selected, and the selected content area 1302 may be associated with one or more links or category tags, or may be associated with text-based annotations. The creation and/or association of the selected content area 1302 to links, category tags, or annotations may be facilitated via a user interface 1306, which may presented by the GUI module 202 once the content area 1302 is selected.

FIG. 14 depicts a screenshot of an exemplary web-interface 1400 for accessing a content object and creating links in accordance with some embodiments. The web-interface 1400 may allow a user to access the text or image-based content of a content object, and may further permit a user to create, delete, modify, or use links, annotations, and/or category tags in association with a content object. In FIG. 14, the web-interface 1400 presents the content of the content object in display 1404 with an annotation 1416 and a visual indicator 1414 corresponding to the annotation 1416. A user may create and/or associate a link with the content area covered by the visual indicator 1414, and may do so by using a link button 1412 of a user interface 1408, which is presented in connection with the visual indicator 1414. Once an option is selected, the web-interface 1400 may present a list of documents 1402, from which a user may select to link and associate with the content area covered by the visual indicator 1414. For instance, a user may select a document 1406 to link to the content area covered by the visual indicator 1414, and may further specify a page and line 1410 in the selected document 1406 for the link to be associated with. Once the link between the document 1406 and the visual indicator 1414 has been established, a user may traverse the link through the web-interface 1400 by simply selecting (e.g., clicking on) the visual indicator 1414.

Figure 15:
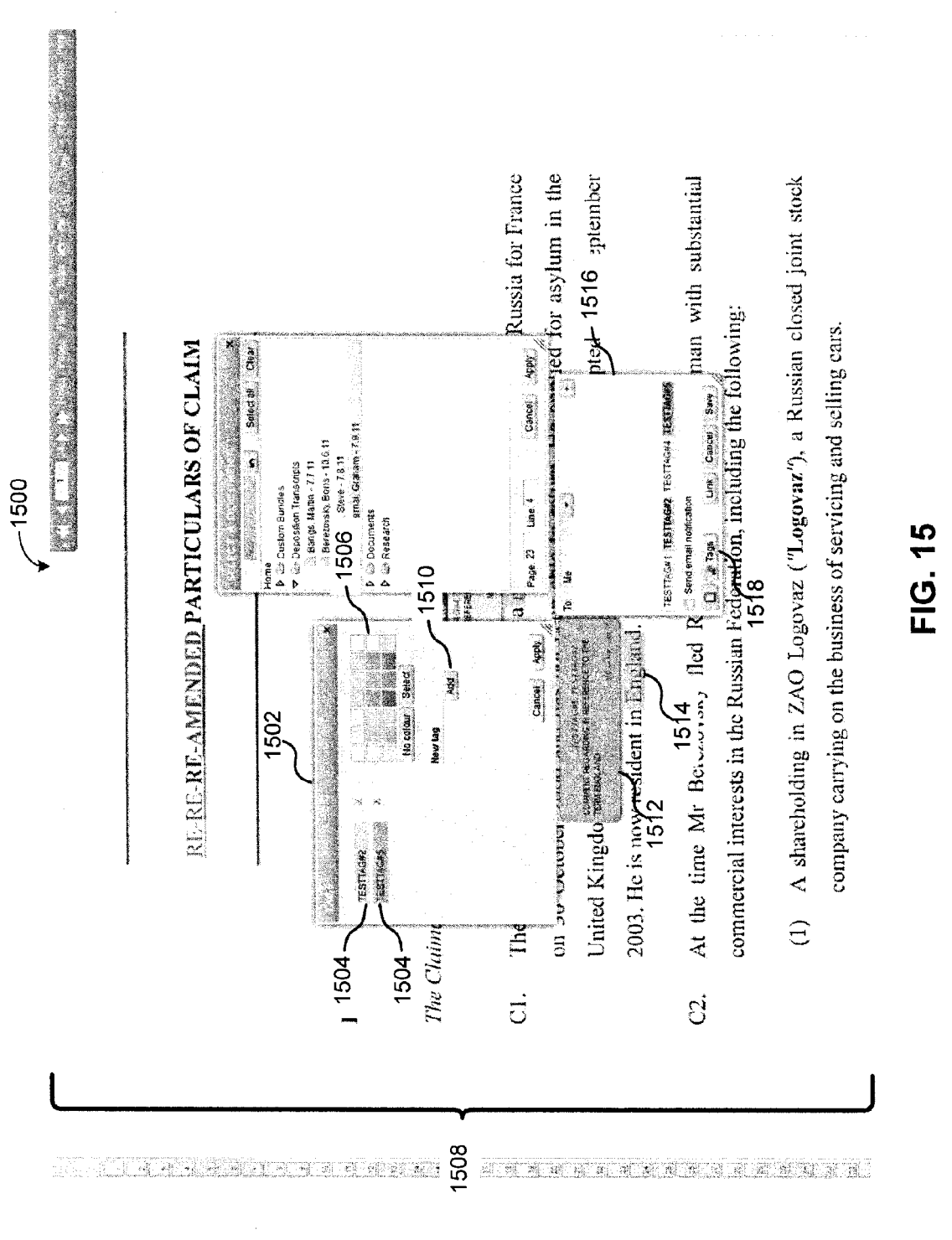

FIG. 15 depicts a screenshot of an exemplary web-interface 1500 for accessing a content object, and creating or modifying links, annotations and/or category tags in accordance with some embodiments. In FIG. 15, the web-interface 1500 presents the content of the content object in display 1508 with an associated annotation 1512 and a visual indicator 1514 corresponding with the annotation 1512. Through web-interface 1500, a user may initiate creation and/or association of a category tag with the visual indicator 1514 using a tag button 1518 (of a user interface 1516) in connection with the annotation 1512. When an option is selected, the web-interface 1500 may present a category tag interface 1502, through which a new category tag may be created. Text field 1510 may receive a label for the new category tag and color selector 1506 may receive a color selection to associate with the new category tag. Those skilled in the art will appreciate that other aspect of a new category tag may also be configured via the category tag interface 1502, including additional visual characteristics (e.g., font color, font type) and relationship(s) between the new category tag and existing category tags (e.g., new category tags relation to a hierarchy of category tags). A listing of category tags 1506, associated with the visual indicator, may be utilized to disassociate category tags with the visual indicator 1514.

Figure 16:
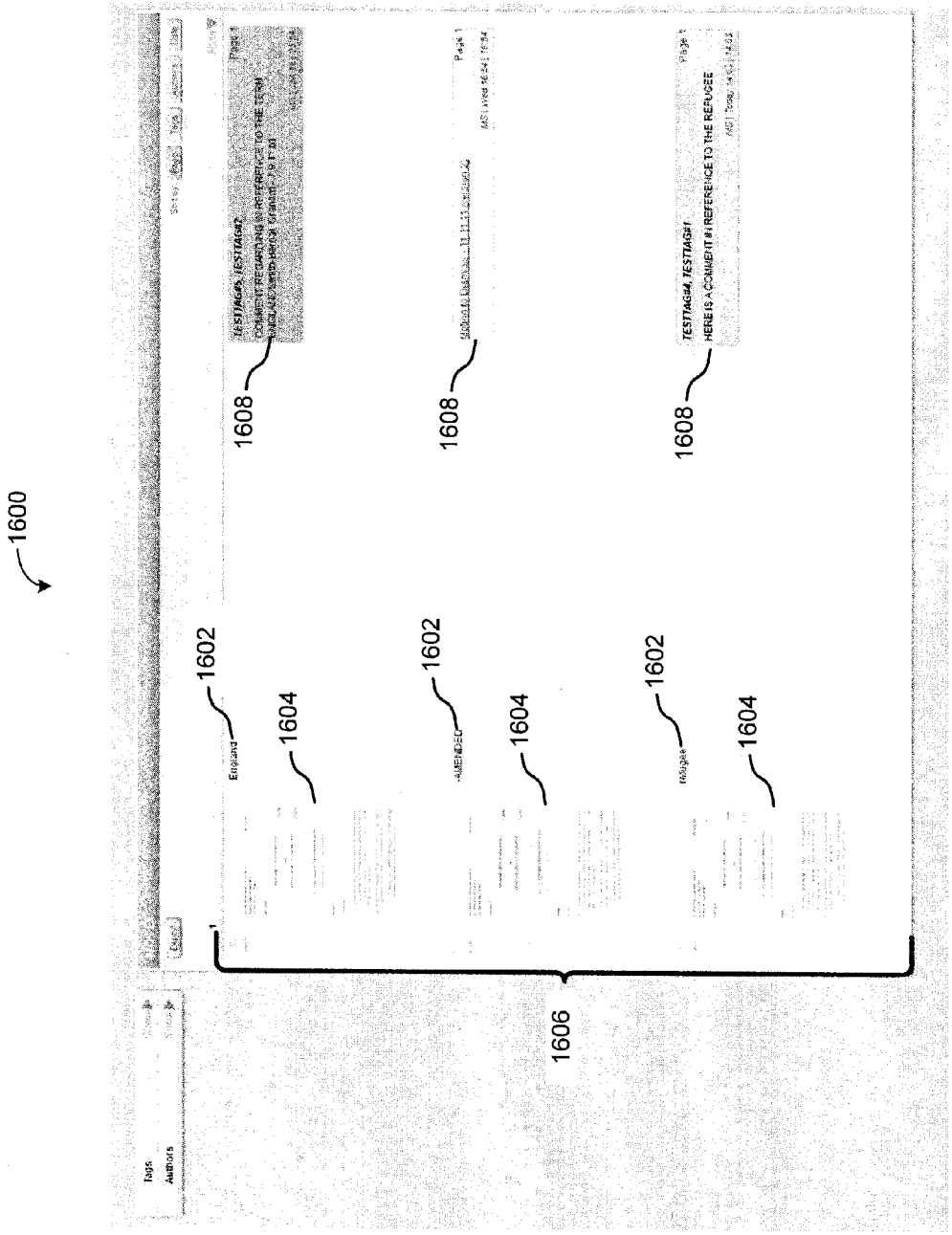
FIG. 16 depicts a screenshot of an exemplary web-interface for accessing a summary of links, annotations, and tags associated with a content object in accordance with some embodiments.

FIG. 16 depicts a screenshot of an exemplary web-interface 1600 for accessing a summary of links, annotations, and tags associated with a content object in accordance with some embodiments. The web-interface 1600 may provide a summary listing of annotations 1606 associated with one or more content objects 1606. For each annotation shown, the listing of annotations 1606 may provide a content preview of the content object 1604 associated with the annotation, a text-portion 1602 of the content object that is associated with the annotation, and the annotation 1608 itself.

Figure 17:
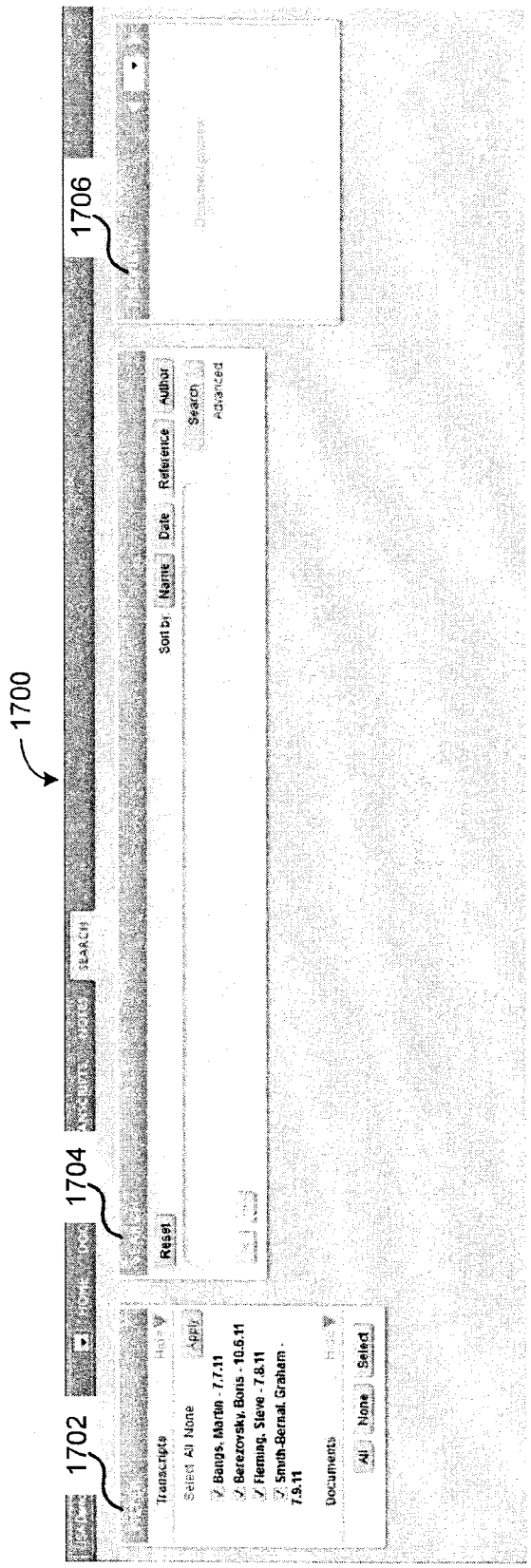
FIG. 17 depicts a screenshot of an exemplary web-interface for searching for a content object in accordance with some embodiments.

FIG. 17 depicts a screenshot of an exemplary web-interface 1700 for searching for a content object in accordance with some embodiments. In some embodiments, the web-interface 1700 may be generated and provided to a user by a GUI module 202, and may allow a user to interact with the search module 222. The web-interface 1700 may comprise a search 1704 for entering, executing, and/or reviewing the results of a search executed by the user (e.g., using the search module 222), and a preview 1706 of one or more content objects that are returned in the search results. The results of a search, or the execution of a search may be further, filter settings 1702 may permit a user to filter aspects of the search. For example, a user may narrow their search for content objects accessible through the system according to type of content object (e.g., transcript or documents). Furthermore, as noted herein, the search 1704 may be employed to seek out the content object, links, and annotations based on their respective content and/or associations with one another. For instance, a content object may be sought based on a link associated with the content object, a user or group of users associated with the content object, a virtual workspace associated with the content object, an annotation associated with the content object, or a category tag associated with the content object.

Figure 18:
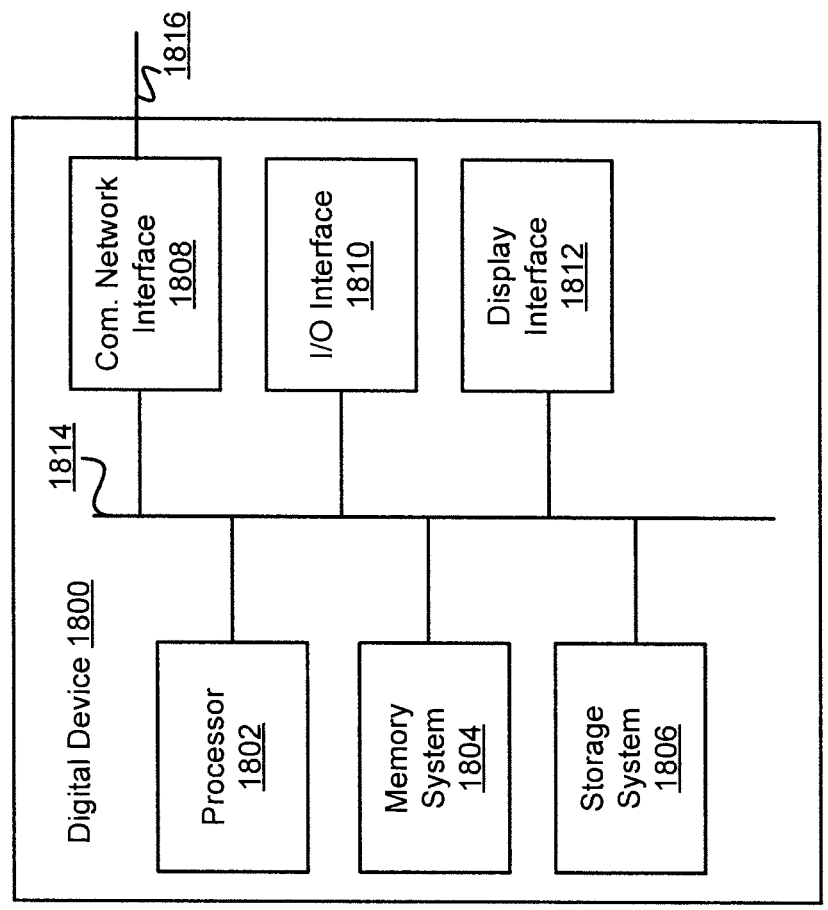
FIG. 18 is a block diagram of an exemplary digital device in some embodiments.

FIG. 18 is a block diagram of an exemplary digital device 1802 in some embodiments. Any of the content objects systems (e.g., 100), devices used by users to interact with the computer content object access systems, the database systems (e.g., 210), and the cloud-based servers (e.g., 212) may be an instance of the digital device 1802. The digital device 1802 comprises a processor 1804, memory system 1806, storage system 1808, an input device 1810, a communication network interface 1812, and an output device 1814 communicatively coupled to a communication channel 1816. The processor 1804 is configured to execute executable instructions (e.g., programs). In some embodiments, the processor 1804 comprises circuitry or any processor capable of processing the executable instructions.

The memory system 1806 stores data. Some examples of memory system 1806 include storage devices, such as RAM, ROM, RAM cache, virtual memory, etc. In various embodiments, working data is stored within the memory system 1806. The data within the memory system 1806 may be cleared or ultimately transferred to the storage system 1808.

The storage system 1808 includes any storage configured to retrieve and store data. Some examples of the storage system 1808 include flash drives, hard drives, optical drives, and/or magnetic tape. Each of the memory system 1806 and the storage system 1808 comprises a computer-readable medium, which stores instructions or programs executable by processor 1804.

The input device 1810 is any device such an interface that receives inputs data (e.g., via mouse and keyboard). The output device 1814 is an interface that outputs data (e.g., to a speaker or display). Those skilled in the art will appreciate that the storage system 1808, input device 1810, and output device 1814 may be optional. For example, the routers/switchers may comprise the processor 1804 and memory system 1806 as well as a device to receive and output data (e.g., the communication network interface 1812 and/or the output device 1814).

The communication network interface (com. network interface) 1812 may be coupled to a network (e.g., network 206) via the link 1818. The communication network interface 1812 may support communication over an Ethernet connection, a serial connection, a parallel connection, and/or an ATA connection. The communication network interface 1812 may also support wireless communication (e.g., 802.11a/b/g/n, WiMax, LTE, WiFi). It will be apparent to those skilled in the art that the communication network interface 1812 can support many wired and wireless standards.

It will be appreciated by those skilled in the art that the hardware elements of the digital device 1802 are not limited to those depicted in FIG. 18. A digital device 1802 may comprise more or less hardware, software and/or firmware components than those depicted (e.g., drivers, operating systems, touch screens, biometric analyzers, etc.). Further, hardware elements may share functionality and still be within various embodiments described herein. In one example, encoding and/or decoding may be performed by the processor 1804 and/or a co-processor located on a GPU (i.e., Nvidia®).

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Additionally, it will be appreciated that a "module" may comprise software, hardware, firmware, and/or circuitry. In one example one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, the functions of the various modules may be combined or divided differently.

Throughout the entirety of the present disclosure, use of the articles "a" or "an" to modify a noun may be understood to be used for convenience and to include one, or more than one of the modified noun, unless otherwise specifically stated.

Various embodiments are described herein as examples. It will be apparent to those skilled in the art that various modifications may be made and other embodiments can be used without departing from the broader scope of the present invention. Therefore, these and other variations upon the exemplary embodiments are intended to be covered by the present invention(s).

What is claimed is:

1. A system comprising:
a shared system storage device configured to store content objects accessible by multiple users with different interests and different viewing rights and to store annotations generated by the multiple users with different interests and different viewing rights;
a processor connected directly or indirectly to the shared system storage device;
a content object management module configured to control the processor to manage storage of the content objects in the shared system storage device;
an import and export module configured to control the processor to obtain the content objects from a plurality of external databases or external applications and to provide the content objects to the content object management module for management;
a conversion module configured to control the processor to convert the content objects from native formats to a system format;
a workspace management module configured to control the processor to associate a first group of one or more users and a set of the content objects with a first virtual workspace, and configured to control the processor to associate a second group of one or more users and the set of the content objects with a second virtual workspace;
an annotation module configured to control the processor to receive from a first user of the first group of one or more users one or more first annotations for a first subset of the set of the content objects, and configured to control the processor to receive from a second user of the second group of one or more users one or more second annotations for a second subset of the set of the content objects;
an access management module configured to control the processor to control first rights of access by the first group of one or more users to the set of the content objects and to the first annotations, and to control second rights of access by the second group of one or more users to the set of the content objects and to the second annotations; and
a GUI module configured to control the processor to enable presentation of the set of the content objects and the first annotations to the first group of one or more users in accordance with the first rights of access, and to enable presentation of the set of the content objects and the second annotations to the second group of one or more users in accordance with the second rights of access.

2. The system of claim 1, further comprising a connector module configured to control the processor to access the plurality of external databases or external applications and to retrieve the content objects therefrom.

3. The system of claim 2, wherein the connector module is further configured to control the processor to access the plurality of external databases or external applications to retrieve a particular one of the content objects when a particular user requests to view the particular one of the content objects.

4. The system of claim 1, wherein at least one of the plurality of external databases or external applications is a cloud-based service.

5. The system of claim 1, wherein at least one of the content objects is a web page from a web site, and the import and export module is further configured to control the processor to retrieve a copy of the web page from the web site.

6. The system of claim 1, further comprising a link module configured to control the processor to create a link between a first one of the content objects and a second one of the content objects.

7. The system of claim 1, wherein the import and export module is further configured to control the processor to index one or more of the content objects or content of the one or more of the content objects.

8. The system of claim 1, further comprising a search module configured to control the processor to search one or more of the content objects based on content, a link associated with the one or more of the content objects, a particular user or group of users associated with the one or more of the content objects, a virtual workspace associated with the one or more of the content objects, an annotation associated with the one or more of the content objects, or a category tag associated with the one or more of the content objects.

9. The system of claim 1, wherein the import and export module is further configured to control the processor to obtain the content objects from the plurality of external databases or external applications on a schedule or upon a request by a particular user to view one or more of the content objects.

10. The system of claim 1, further comprising a tagging module configured to control the processor to create a category tag and associate the category tag with one or more of the content objects.

11. A method comprising:
receiving content objects from a plurality of external databases or external applications;
converting the content objects from one or more native formats to a system format;
storing the content objects in a shared system storage device accessible by multiple users with different interests and different viewing rights;
associating a first group of one or more users and a set of the content objects with a first virtual workspace;
associating a second group of one or more users and the set of the content objects with a second virtual workspace;

receiving from a first user of the first group of one or more users one or more first annotations for a first subset of the set of the content objects;

receiving from a second user of the second group of one or more users one or more second annotations for a second subset of the set of the content objects;

controlling first rights of access by the first group of one or more users to the set of the content objects and to the first annotations;

controlling second rights of access by the second group of one or more users to the set of the content objects and to the second annotations;

enabling the first group of one or more users to access the set of the content objects and the first annotations in accordance with the first rights of access; and enabling the second group of one or more users to access the set of the content objects and the second annotations in accordance with the second rights of access.

12. The method of claim 11, wherein the step of receiving the content objects from the plurality of external databases or external applications is performed when a particular user requests to view the content objects.

13. The method of claim 11, wherein at least one of the plurality of external databases or external applications is a cloud-based service.

14. The method of claim 11, wherein at least one of the content objects is a copy of a web page received from a web site.

15. The method of claim 11, further comprising creating a link between a first one of the content objects and a second one of the content objects.

16. The method of claim 11, further comprising indexing one or more of the content objects.

17. The method of claim 11, further comprising searching one or more of the content objects based on content, a link associated with the one or more of the content objects, a particular user or group of users associated with the one or more of the content objects, a virtual workspace associated with the one or more of the content objects, an annotation associated with the one or more of the content objects, or a category tag associated with the one or more of the content objects.

18. The method of claim 11, further comprising creating a category tag and associating the category tag with one or more of the content objects.

* * * * *